US 11,290,850 B2

(12) United States Patent
Jeong et al.

(10) Patent No.: US 11,290,850 B2
(45) Date of Patent: Mar. 29, 2022

(54) METHODS AND APPARATUSES FOR INDOOR POSITIONING USING PARTICLE FILTER BASED ON INTENSITY OF RADIO SIGNAL

(71) Applicant: RESEARCH & BUSINESS FOUNDATION SUNGKYUNKWAN UNIVERSITY, Suwon-si (KR)

(72) Inventors: Jaehoon Jeong, Busan (KR); Yiwen Shen, Suwon-si (KR)

(73) Assignee: RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 0 days.

(21) Appl. No.: 16/892,675

(22) Filed: Jun. 4, 2020

(65) Prior Publication Data

US 2020/0389764 A1 Dec. 10, 2020

(30) Foreign Application Priority Data

Jun. 5, 2019 (KR) .................. 10-2019-0066831
Apr. 14, 2020 (KR) .................. 10-2020-0045528

(51) Int. Cl.
*H04W 4/029* (2018.01)
(52) U.S. Cl.
CPC .................. *H04W 4/029* (2018.02)
(58) Field of Classification Search
CPC ..... H04W 4/029; H04W 4/02; G01S 2205/02; G01S 5/0278
See application file for complete search history.

(56) References Cited

U.S. PATENT DOCUMENTS 10,656,282 B2 * 5/2020 Irish .................. G01S 19/22
10,871,547 B1 * 12/2020 Patel .................. H04W 4/80
(Continued)

FOREIGN PATENT DOCUMENTS

KR 10-2010-0124649 A 11/2010
KR 10-1231378 B1 2/2013
(Continued)

OTHER PUBLICATIONS

Hwang, Design and Implementation of Indoor Positioning System using Particle Filter based on a Wireless Signal Intensity, master's thesis of the inventor, Collection @skku, Feb. 1, 2019, 53 pages.
(Continued)

*Primary Examiner* — Julio R Perez
(74) *Attorney, Agent, or Firm* — NSIP Law

(57) ABSTRACT

Provided are an indoor positioning method of a positioning apparatus using a particle filter based on an RSSI includes initializing a particle in a base map corresponding to a target space for positioning, measuring a first distance value between a terminal and a beacon and a second distance value between the particle and the beacon, calculating a weight of the particle by comparing the first distance value and the second distance value, updating a previous weight of the particle based on the weight and resampling the particle, deriving location estimation coordinates of the terminal if the resampling has been performed as many as a given number of times, and moving the particle to a given point in the target space and repeatedly measuring the first distance value and the second distance value again.

9 Claims, 28 Drawing Sheets

(56) References Cited

U.S. PATENT DOCUMENTS

2015/0031390 A1* 1/2015 Robertson ............ G01C 21/206
　　　　　　　　　　　　　　　　　　　　　　　　　455/456.1
2017/0074965 A1* 3/2017 Lee ........................ G01S 5/14
2018/0167140 A1* 6/2018 Brandt-Pearce ... H04B 10/1149
2020/0367192 A1* 11/2020 Ji ........................ H04L 43/028

FOREIGN PATENT DOCUMENTS

KR　　10-1268564 B1　　5/2013
KR　　10-1730269 B1　　4/2017

OTHER PUBLICATIONS

Shen et al., "Indoor Positioning System for Beacon Tag Tracking," The Korean Institute of Communications and Information Sciences, winter conference, Feb. 6, 2020, pp. 480-481.
Hwang et al., "Design and Implementation of Indoor Positioning System Using Particle Filter Based on Wireless Signal Intensity," ISSN 2383-630X(Print) / ISSN 2383-6296(Online), Journal of KIISE, Apr. 14, 2020, vol. 47, No. 4, pp. 433-444.
Korean Office Action dated Jul. 14, 2021 in counterpart Korean Patent Application No. 10-2020-0045528 (11 pages in Korean).

* cited by examiner

METHODS AND APPARATUSES FOR INDOOR POSITIONING USING PARTICLE FILTER BASED ON INTENSITY OF RADIO SIGNAL

CROSS-REFERENCE TO RELATED APPLICATIONS

This application claims priority to Korean Patent Application No. 10-2019-0066831 filed on 5 Jun. 2019 and Korean Patent Application No. 10-2020-0045528 filed on 14 Apr. 2020 in Korea, the entire contents of which are hereby incorporated by reference in their entirety.

BACKGROUND

1. Technical Field

The present disclosure relates to an indoor positioning technology and, more particularly, to a methods and apparatuses for indoor positioning using a particle filter based on a received signal strength indicator (RSSI), which can efficiently calculate a particle weight.

2. Description of Related Art

Indoor positioning is a core technology for a location-based service (LBS), including a map, a navigator, tracking, information provision and other derivative application programs.

The first of researches related to an indoor location recognition scheme includes dead-reckoning, that is, a method of tracking a location by detecting a walking motion of a person using the inertial sensor of a smartphone. Such positioning natively has an accumulated error problem using the inertial sensor of a smartphone. A result value of location coordinates estimated consecutively to a result value of already estimated location coordinates is accumulated. Accordingly, if an erroneous result value is included in the location coordinate estimation process, the positioning has a problem in that an error rate is gradually increased because an error is not corrected and continues to be accumulated.

Second, an indoor positioning system (IPS) using wireless communication may estimate the location of an object using various types of information, such as a received signal strength indicator (RSSI), inertial information, channel state information, an arrival angle, a flight time and an arrival phase.

A representative positioning method includes a positioning method based on an RSSI. The positioning method using an RSSI has a characteristic in that it is vulnerable to a surrounding environment (e.g., the exterior wall of a building, a person or a radio wave signal) due to the non-linear property of a propagation model. The positioning method based on an RSSI has a property that the error rate of the propagation model is incorporated into a positioning error without any change because a location is estimated based on the signal intensity of the propagation model.

Location estimation using RSSI information is simple, but is instable due to the influence of other factors, such as a signal multi-path effect, noise and interference. In order to improve the instability of a location estimation system based on RSSI, various approaches, such as a positioning scheme using dead-reckoning in which inertial information and RSSI have been combined, are proposed.

SUMMARY

Some embodiments of the present disclosure proposes a method and apparatus for indoor positioning, which can guarantee positioning accuracy by developing a positioning scheme by which positioning errors can appear uniformly even in an indoor environment including severe radio signal interference.

Some embodiments of the present disclosure also proposes an efficient method and apparatus for indoor positioning using a particle filter based on an RSSI.

Some embodiments of the present disclosure also provides an indoor positioning system using a particle filter for beacon tag tracking, for tracking the location of a tag (or target) in an indoor environment using a particle filter.

Technical objects to be achieved in the present disclosure are not limited to the aforementioned technical objects, and other technical objects not described above may be evidently understood by a person having ordinary skill in the art to which the present disclosure pertains from the following description.

In an aspect, an indoor positioning method of a positioning apparatus using a particle filter based on a received signal strength indicator (RSSI) includes initializing a particle in a base map corresponding to a target space for positioning, measuring a first distance value between a terminal and a beacon and a second distance value between the particle and the beacon, calculating a weight of the particle by comparing the first distance value and the second distance value, updating a previous weight of the particle based on the weight and resampling the particle, deriving location estimation coordinates of the terminal if the resampling has been performed as many as a given number of times, and moving the particle to a given point in the target space and repeatedly measuring the first distance value and the second distance value again. One or more terminals and one or more beacons may be disposed in the target space for positioning.

In another aspect, an indoor positioning apparatus using a particle filter based on a received signal strength indicator (RSSI) includes a communication unit for transmitting and receiving signals, a memory storing data, and a controller configured to control the communication unit and the memory. The controller may be configured to initialize a particle in a base map corresponding to a target space for positioning, measure a first distance value between a terminal and a beacon and a second distance value between the particle and the beacon, calculate a weight of the particle by comparing the first distance value and the second distance value, update a previous weight of the particle based on the weight and resampling the particle, derive location estimation coordinates of the terminal if the resampling has been performed as many as a given number of times, and move the particle to a given point in the target space and repeatedly measure the first distance value and the second distance value again. One or more terminals and one or more beacons may be disposed in the target space for positioning.

Preferably, the first distance value and the second distance value may be repeatedly measured if the resampling has not been performed as many as the given number of times.

Preferably, the first distance value may be calculated by converting an RSSI value of the beacon measured by the terminal.

Preferably, the second distance value may be calculated based on a coordinate value of the particle and a coordinate value of the beacon.

Preferably, the weight may be calculated based on likelihood between the second distance value and the first distance value for an identical beacon with respect to all beacons disposed in the target space.

Preferably, the indoor positioning method may further include assigning a proximity weight to the weight based on a proximate degree between the terminal and the beacon and a proximate degree between a location of the particle and a location of the beacon.

Preferably, assigning the proximity weight may include calculating an operation of multiplying the proximity weight by the weight.

Preferably, the proximity weight may be calculated based on the first distance value.

Preferably, the location estimation coordinates may be calculated as an average of coordinate values of all particles present in the target space.

Preferably, the movement of the particle may include randomly moving the coordinates of the particle within a predetermined range in the target space.

Preferably, the indoor positioning method may further include correcting the weight using a positioning section weight map based on information on the target space.

Preferably, the controller may be configured to repeatedly measure the first distance value and the second distance value if the resampling has not been performed as many as the given number of times.

Preferably, the controller may be configured to calculate the first distance value by converting an RSSI value of the beacon measured by the terminal.

Preferably, the controller may be configured to calculate the second distance value based on a coordinate value of the particle and a coordinate value of the beacon.

Preferably, the controller may be configured to calculate the weight based on likelihood between the second distance value and the first distance value for an identical beacon with respect to all beacons disposed in the target space.

Preferably, the controller may be configured to assign a proximity weight to the weight based on a proximate degree between the terminal and the beacon and a proximate degree between a location of the particle and a location of the beacon.

Preferably, the controller may be configured to calculate the location estimation coordinates as an average of coordinate values of all particles present in the target space.

Preferably, the controller may be configured to may randomly move the coordinates of the particle within a predetermined range in the target space.

Preferably, the controller may be configured to correct the weight using a positioning section weight map based on information on the target space.

In another aspect, an indoor positioning method of an indoor positioning apparatus using a particle filter based on a received signal strength indicator (RSSI) may include preprocessing RSSI information of a tag received through an access point positioned in an interior, resampling each of particles by comparing a third distance value between the tag and the access point, calculated using the preprocessed RSSI information, and a fourth distance value between each of the particles and the access point, calculated based on a particle filter distributed in the interior and estimating an approximated location of the tag from a location of each of the resampled particles, and tracking the estimated approximated location of the tag.

Preprocessing the RSSI information may include filtering out noise of the received RSSI information using a Kalman filter.

Preprocessing the RSSI information may include estimating an RSSI value by updating an RSSI value, calculated through a Kalman gain based on the received RSSI information, based on an error covariance to be used for next estimation and an update of a current state.

Estimating the location of the tag may include performing an operation of setting the size of the interior, an operation of setting coordinates of an access point in the interior and an operation of generating and distributing a plurality of particles.

Estimating the location of the tag may include normalizing each of the third distance value and the fourth distance value as the size of the interior.

Estimating the location of the tag may include calculating a weight of each of the particles distributed in the interior based on a difference value between the third distance value and the fourth distance value.

Estimating the location of the tag may include resampling each of the particles using a weight-based unbiased sampling scheme for selecting a particle having a low weight with a low probability although a probability that a particle having a higher weight is to be duplicated using each of the calculated weights of the particles is increased.

Estimating the location of the tag resampling each of the particles using a stochastic universal sampling (SUS) scheme based on a random number between a selection interval and a preset section so that a probability that a particle having a higher weight is to be duplicated using each of the calculated weights of the particles is increased.

Estimating the location of the tag may include estimating a center of each of the resampled particles as the location of the tag.

In yet another aspect, an indoor positioning apparatus using a particle filter based on a received signal strength indicator (RSSI) may include a communication unit for transmitting and receiving signals, a memory storing data, and a controller configured to control the communication unit and the memory. The controller may be configured to preprocess RSSI information of a tag received through an access point positioned in an interior, resample each of particles by comparing a third distance value between the tag and the access point, calculated using the preprocessed RSSI information, and a fourth distance value between each of the particles and the access point, calculated based on a particle filter distributed in the interior and estimate an approximated location of the tag from a location of each of the resampled particles, and track the estimated approximated location of the tag.

The controller may be configured to filter out noise of the received RSSI information using a Kalman filter.

The controller may be configured to estimate an RSSI value by updating an RSSI value, calculated through a Kalman gain based on the received RSSI information, based on an error covariance to be used for next estimation and an update of a current state.

The controller may be configured to perform an operation of setting the size of the interior, an operation of setting coordinates of an access point in the interior and an operation of generating and distributing a plurality of particles.

The controller may be configured to normalize each of the third distance value and the fourth distance value as the size of the interior.

The controller may be configured to calculate a weight of each of the particles distributed in the interior based on a difference value between the third distance value and the fourth distance value.

The controller may be configured to resample each of the particles using a weight-based unbiased sampling scheme for selecting a particle having a low weight with a low probability although a probability that a particle having a higher weight is to be duplicated using each of the calculated weights of the particles is increased.

The controller may be configured to resample each of the particles using a stochastic universal sampling (SUS) scheme based on a random number between a selection interval and a preset section so that a probability that a particle having a higher weight is to be duplicated using each of the calculated weights of the particles is increased.

The controller may be configured estimate a center of each of the resampled particles as the location of the tag.

BRIEF DESCRIPTION OF THE DRAWINGS

The accompany drawings, which are included as part of the detailed description in order to help understanding of the present disclosure, provide embodiments of the present disclosure and describe the technical characteristics of the present disclosure along with the detailed description.

DETAILED DESCRIPTION OF EXAMPLE EMBODIMENTS

Figure 1:
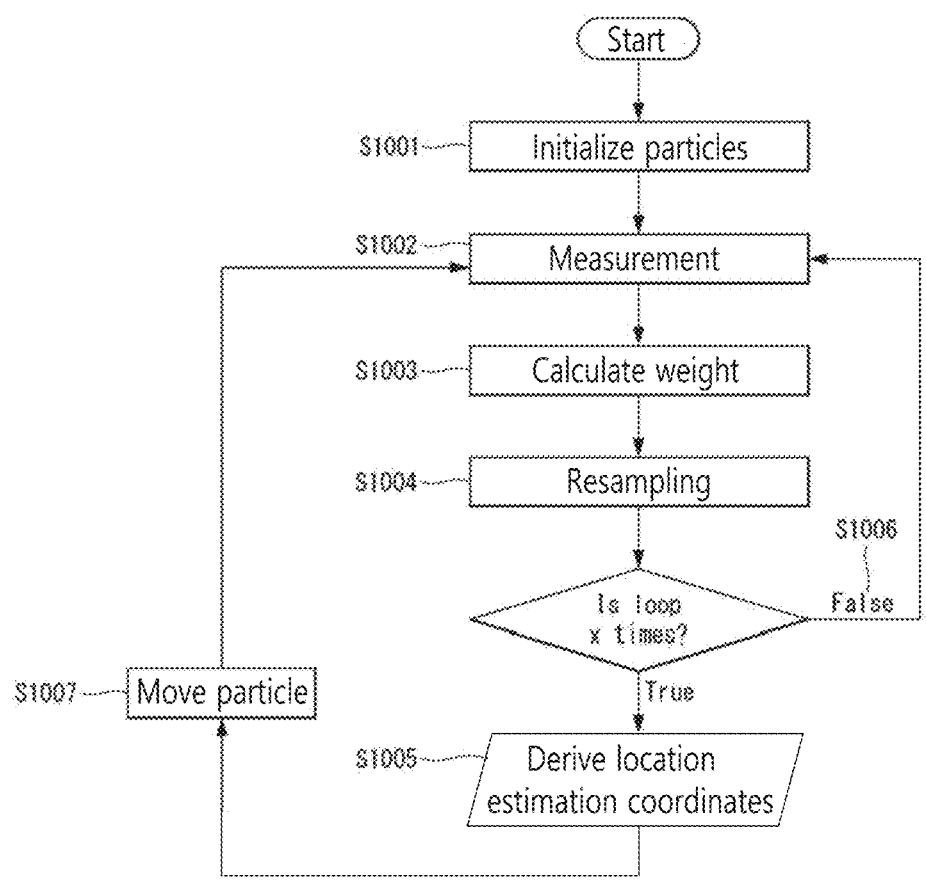
FIG. 1 is a diagram illustrating a flowchart of an indoor positioning method using a particle filter according to an embodiment of the present disclosure.

The following technology may be changed in various ways and may have various embodiments, and specific embodiments are illustrated in the drawings and described in detail. It is however to be understood that the present disclosure is not intended to be limited to the specific disclosure and that the present disclosure includes all changes, equivalents and substitutions which fall within the spirit and technological scope of the present disclosure.

Terms, such as a first, a second, A and B, may be used to describe various elements, but the elements should not be restricted by the terms. The terms are used to only distinguish one element from the other element. For example, a first element may be named a second element without departing from the scope of rights of the present disclosure. Likewise, a second element may be named a first element. The term "and/or" includes a combination of a plurality of related and illustrated items or any one of a plurality of related and described items.

In the terms used in this specification, an expression of the singular number should be construed as including an expression of the plural number unless clearly defined otherwise in the context. It is to be understood that in this specification, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

Prior to a detailed description of the drawings, it is evident that the elements in this specification have been merely classified according to a main function managed by each element. That is, two or more elements to be described below may be merged into one element or one element may be divided into two or more elements for each more subdivided function. Furthermore, each of the elements to be described below may additionally perform some or all of functions managed by another element in addition to its main function, and some of a main function managed by each element may be exclusively performed by another element.

Furthermore, in performing a method or an operation method, processes forming the method may be performed in order different from order described in the context unless specific order is clearly described in the context. That is, the steps may be performed according to described order, may be performed substantially at the same time, or may be performed in reverse order.

The present disclosure relates to a method of positioning the location of a terminal using a radio resource called a beacon in an indoor space in which the use of the GPS is impossible, and provides predicting the location of a terminal using a simulation-based prediction scheme called a particle filter.

The particle filter is an algorithm using a method of finding out a prediction value based on a given distribution if a value for calculating a result value to be derived is not represented in a closed form or complicated.

The particle filter is a scheme suitable for a non-linear or non-Gaussian system, and is used to infer a prediction value based on a Montecarlo simulation scheme using input measurement states. The particle filter is based on Bayesian conditional probabilities, such as prior distributions and posterior distributions, and finds the characteristics of a state variable by calculating the weight of each particle unlike a Kalman filter suitable for a linear system and for analytically calculating prior distributions.

A more detailed embodiment related to an indoor positioning method using a particle filter based on an RSSI is described later with reference to FIG. 1. The following embodiments may be applied to an indoor positioning apparatus using a particle filter based on an RSSI. However, the disclosure is not limited thereto, and the following embodiments may be introduced and/or applied to various positioning apparatuses.

FIG. 1 is a flowchart illustrating an indoor positioning method using a particle filter according to an embodiment of the present disclosure. In the present embodiment, at least one step may be deleted or a new step may be added.

1. First, the step S1001 of initializing particles 220 in a base map 230 may be performed as follows. A positioning apparatus 5000 (refer to FIG. 5) generate the base map 230 corresponding to a space, that is, a target for positioning, and distributes the particles 220 to the entire base map 230 with a uniform distribution. The base map 230 may be generated as a vector form map or a two-dimensional map, for example. Each of the particles 220 includes information values, such as a coordinate value and a weight located within the base map 230. The number of distributed particles 220 is basically proportional to the size of a space, but may be increased or decreased within a proper range depending on a target for positioning, if necessary.

2. The particle filter performs a measurement step S1002 in order to update the weight $w_t^{(i)}$ of each of the particles 220. The measurement step includes the step of measuring a first distance value between a terminal 210 and a beacon 200 and a second distance value between the particle 220 and the beacon 200. One or more beacons may be located in the space, that is, a target for positioning. The number of terminals 210 located within the space may be one or more. The first distance value may be calculated by converting a received signal strength indicator (RSSI) measurement value of the beacon measured by the terminal 210. In this case, the RSSI measurement value may use an RSSI filtered through a Kalman filter algorithm. Furthermore, the second distance value may be calculated based on a coordinate value of the particle 220 and a coordinate value of the beacon 200. To this end, a Euclidean distance algorithm may be used. In order to calculate the second distance value, the indoor positioning apparatus needs to be previously aware of the coordinate value of the particle 220 and the coordinate value of the beacon 200. The coordinate value of the particle 220 may be presented through the step of initializing the particle 220. The coordinate value of the beacon 200 is presented as a coordinate value of a beacon located in the space, that is, a target for positioning.

Figure 2:
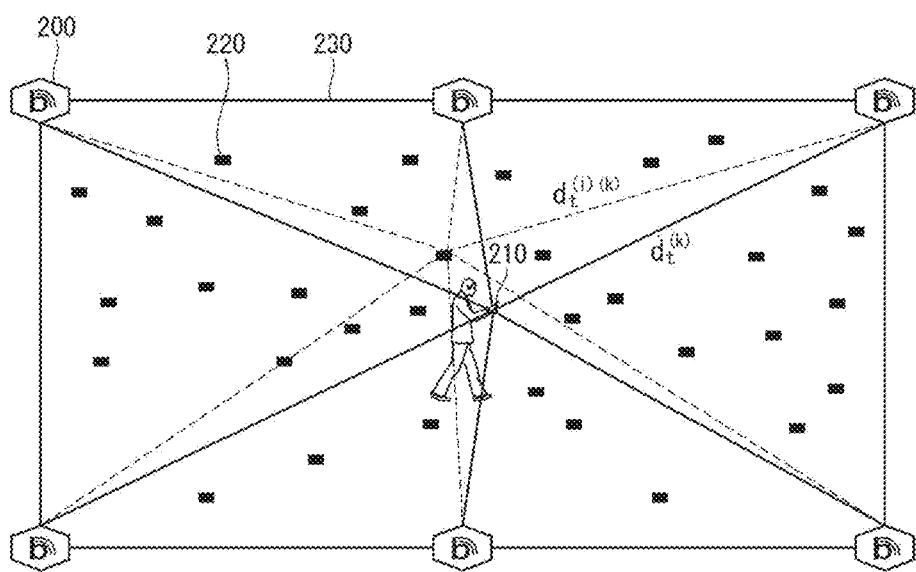
FIG. 2 is a diagram illustrating a method of computing likelihood.

3. A weight of the particle 220 is calculated by comparing the first distance value and the second distance value (S1003). The weight is calculated by computing likelihood. FIG. 2 is a diagram illustrating a method of computing such likelihood. A method of computing likelihood is described as follows with reference to FIG. 2.

The positioning apparatus 5000 calculates a distance ($d_t^{(i)(k)}$) between the coordinates of each of the particles 220 and the coordinates of each of the beacons 200, calculates the distance ($\acute{d}_t^{(k)}$) between the beacons 200 measured by the terminal 210, and drives the weight of a corresponding particle 220 through likelihood between the two distances. A distance comparison value necessary to derive the weight of each of the particles 220 may be calculated by Equation 1.

$$Z_t^{(i)(k)} = d(X_t^{(i)}, X_{node}^{(k)})/d_{max}$$

$$Z_t^{rss(k)} = \acute{d}_t^{(k)}/\acute{d}_{max} \quad (1)$$

$z_t^{(i)(k)}$ is a value normalized by calculating a distance between an (i)-th particle and a (k)-th beacon through Euclidean distance algorithm. $z_t^{rss(k)}$ is a value normalized by converting an RSSI measurement value of the (k)-th beacon, measured by the terminal 210, into a distance value. $d_{max}$ for the normalization of $z_t^{(i)(k)}$ is a maximum distance between a given particle and a given beacon with respect to all particles now generated in an indoor space. $\acute{d}_{max}$ for the normalization of $z_t^{rss(k)}$ is a maximum distance conversion value on which a given beacon may be detected in a smartphone. $\acute{d}_{max}$ is set as the longest diagonal length of the indoor space if the smartphone can move to anywhere in the layout of the indoor space.

A corresponding particle weight is obtained based on a difference between the normalized two distance values ($z_t^{(i)(k)}$ and $z_t^{rss(k)}$). The weight may be derived using Equation 2.

$$\omega_t^{(i)} = \frac{1}{j}\left(1 - \sum_{k=1}^{j} |z_t^{(i)(k)} - z_t^{rss(k)}|\right) \quad (2)$$

That is, the weight ($w_t^{(i)}$) of the (i)-th particle may be derived by determining how much is each distance estimation value estimated by the terminal 210 through j beacons 200 similar to a distance from the point where a corresponding particle is located.

4. A previous weight of the particle is updated using the weight calculated at step 3. The particle 220 is resampled based on the updated weight (S1004). For the update, the positioning apparatus needs to be aware of the previous weight, and may use a memory as means for storing the previous weight. The resampling refers to a process of removing a particle 220 having a low probability and generating particles 220 again by splitting a particle 220, having a high probability, into several particles. The resampling is performed in order to prevent a degeneracy phenomenon in which a distribution of a set of particles 220 converges on some point because the weights of some particles 220 are repeatedly increased in the process of updating a weight. A resampling method to be described later is an embodiment of the resampling method, and resampling using another proper method may be performed.

First, a set ($Z_t$) of n particles 220 having weights in a time (t) used to calculate a probability distribution for performing resampling may be defined by Equation 3.

$$Z_t = \{(x_t^{(i)}, w_t^{(i)}) | i=1, \ldots, n\} \quad (3)$$

In Equation 3, $x_t^{(i)}$ denotes the location of the particle 220. $w_t^{(i)}$ denotes the weight of each of the particles 220. Accordingly, Montecarlo simulations based on a probability distribution having a given form not an analytic method may be performed.

The inference model of the particle filter may be defined by Equation 4 based on the Bayesian inference rule.

$$P(X_t | Z_t) = \frac{P(Z_t | X_t) P(X_t)}{P(Z_t)} \quad (4)$$

In Equation 4, the posterior probability $P(X_t|Z_t)$ is recursively calculated by a set $Z_t$ of n particle. The particle set $Z_t$ is assigned a weight by a prior probability $P(Z_t|X_t)$. The particle filter calculates an approximate value of a posterior probability $P(X_{t-1}|Z_{t-1})$ in a timing step t−1 using a particle $\{x_{t-1}^{(i)}, w_{t-1}^{(i)}\}$ having a weight, and estimates an approximate value of the posterior probability $P(X_t|Z_t)$ in a next timing step by continuously resampling the particles. In the present disclosure, as an embodiment of a resampling scheme, a particle is reselected several times in proportion to a particle weight, but a weight-based unbiased sampling algorithm for selecting a particle having a small weight is used. The weight-based unbiased sampling algorithm is represented using a pseudocode as in Table 1.

TABLE 1

$\overline{X}_t = \emptyset$
$\beta = \max(w_t^{(1)},...,w_t^{(M)}) \triangleright$  get the highest weight $\beta$ from all the particles
$U = 0$
$i = \text{rand}(1, |M|) \triangleright$  start with a random integer index $i$ from particles
for m = $1_{to}$ M$_{do}$
$U = U + \text{rand}(0,1) \cdot \beta \cdot 2 \triangleright$  initialize a threshold $U$
while $U > w_t^{(i)} \triangleright$  repeat the while loop as long as $U$ is greater than $w_t^{(i)}$
$i = i+1$  $\triangleright$ move $i$ to the next particle index
$U = U - w_t^{(i)} \triangleright$  reduce $U$ by the weight $w_t^{(i)}$
end while
add $\alpha_t^{(i)}$ to $\overline{X}_t$ $\triangleright$  insert a particle point $\alpha_t^{(i)}$ to the set $\overline{X}_t$
end for
return $\overline{X}_t$ In general, the weight-based unbiased sampling algorithm provides unbiasedness by which a particle having a low weight is selected compared to the existing roulette wheel selection scheme. In the roulette wheel selection scheme, a next generation is determined by turning a wheel having one needle several times. The weight-based unbiased sampling algorithm provides resampling having less bias than roulette wheel selection scheme because it provides the opportunity of selection to a particle having a low weight.

In the present disclosure, as another embodiment of the resampling scheme, a stochastic universal sampling (SUS) algorithm, that is, a method of randomly extracting a particle and simultaneously extracting a particle at given intervals is used. The SUS algorithm is represented using a pseudocode as in Table 2.

TABLE 2

$\overline{X}_t = \emptyset$
$r = \text{rand}(0; M^{-1})$
$c = w_t^{(1)} \triangleright$  initialize a CDF(cumulative distribution function) c with weight $w_t^{(1)}$
$i = 1$
for m = $1_{to}$ M $_{do}$
$U = r + (m-1) \cdot M^{-1} \triangleright$  initialize a threshold U
while $U > c \triangleright$  repeat the while loop as long as U is greater than c
$i = i+1$
$c = c + w_t^{(i)} \triangleright$  increase the CDF c by the weight $w_t^{(i)}$
end while
add $x_t^{(i)}$ to $\overline{X}_t \triangleright$  insert a particle point $x_t^{(i)}$ to the set $\overline{X}_t$
end for
return $\overline{X}_t$ In general, the SUS algorithm is used to minimize a problem in selecting fitness balance which may occur in a small group, and provides the opportunity of selection to a particle having a low weight because it selects a next generation by turning a wheel having needles at equal intervals compared to the roulette wheel selection scheme. Accordingly, the SUS algorithm has a small dispersion because it does not have a bias and has only the least diffusion.

5. Next, whether the resampling is performed by a given number of times (x) is determined. If it is determined that the resampling has been performed by the given number of times (x), coordinates estimated as the location of the terminal 210 may be derived (S1005). In general, the size of the resampling is n, and is equal to the size of a previous sample. However, the given number of times may be randomly determined by a user, and may be calculated by considering the size of a space, a target for positioning, and a moving speed of the terminal 210, that is, bases for positioning. Furthermore, in relation to the period of the resampling, the broadcasting period of the beacon 200 may be considered. If the given number of times is great, more accurate location estimation coordinates may be derived, but there is a disadvantage in that the time taken for derivation is long. If the given number of times is small, accuracy is low, but there is an advantage in that an execution time is fast. Accordingly, a proper number of times may be reasonably selected based on an environment in which a positioning method is performed. The location estimation coordinates may be derived through Equation 5.

$$\hat{X}_t = \frac{1}{n}\sum_{i=1}^{n} X_t^{(i)} \qquad (5)$$

Referring to Equation 5, the location estimation coordinates $\hat{X}_t$ are derived by calculating an average of the (x, y) coordinates of all particles present in a corresponding step. If the resampling has not been performed by the given number of times, 1 is added to the number count of the resampling, and the resampling is performed again from the measurement step (S1006).

6. The location of the terminal 210 may be changed in real time. Accordingly, in order to derive subsequent location estimation coordinates, after the particle 220 is moved to a given point in the target space, the process is performed again from the measurement step (S1007). In the movement of the particle 220, a process of stochastically predicting a result value using a random number called a Montecarlo method is performed. In this case, a random walk scheme is used to generate the random number and move the particles 220. The random walk means that the coordinates of each of the particles 220 are randomly moved within a predetermined range.

If a distribution of the moved particles 220 is too much narrow through the step of moving the particles 220, there is a good possibility that the distribution may converge on local minima. In contrast, if a distribution of the particles 220 is too much wide, there is a problem in that a positioning error increases. In the present disclosure, in order to solve such a problem, a proximity weight is additionally assigned to the weight of the particle 220 based on a proximate degree between the location of the terminal 210 and the location of the beacon 200 that is closely measured. In this case, the particles 220 can rapidly find out the location of the terminal

210 because an additional proximity weight is assigned to a particle 220 closer to the location of the terminal 210.

Equation 6 illustrates a method of assigning a proximity weight a to a particle weight.

$$\alpha = \exp\left(-\hat{d}_t^{(k)}/2\right) \quad (6)$$

$$\omega_t^{(i)} = \frac{1}{j}\left(1 - \sum_{k=1}^{j} \alpha |z_t^{(i)(k)} - z_t^{rss(k)}|\right)$$

If a set of first distance values measured by the terminal 210 is aligned in ascending order of the closest distance, the proximity weight a assigned to each of the particle 220 may be defined as above. Accordingly, the particle 220 may be assigned a derived weight without any change with respect to a beacon closely measured from the terminal 210.

However, the particle 220 is assigned a proximity weight lower than 1 with respect to a beacon farther measured from the terminal 210. Finally, the particle 220 is sequentially assigned weights lower than the originally derived weight.

Figure 3:
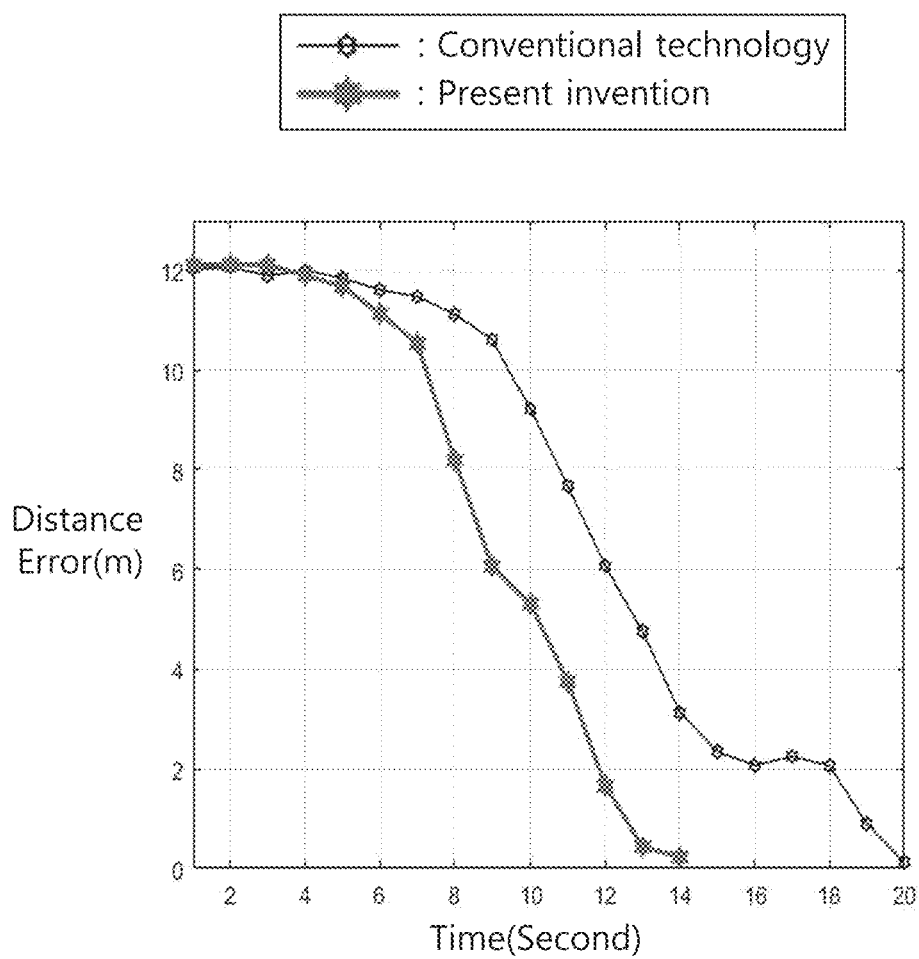
FIG. 3 is a diagram illustrating a graph showing the results of a comparison between position execution times related to whether to assign a proximity weight according to an embodiment of the present disclosure.

FIG. 3 is a diagram illustrating a graph showing the results of a comparison between position execution times related to whether to assign a proximity weight according to an embodiment of the present disclosure. Referring to FIG. 3, if a proximity weight was not assigned to the particles 220, the time necessary to reach a target point was about 20 seconds. If a proximity weight was assigned to the particles 220, the time necessary to reach the target point was about 14 seconds. It was confirmed that if a proximity weight is assigned to particles 220 close to the location of a beacon that is most closely measured based on a change in the location of the terminal 210, the changed location of the terminal 210 can be found about 6 seconds faster.

Additionally, in order to reduce a positioning error in a positioning-vulnerable section, positioning may be separately performed on a section in which positioning needs to be intensively performed (e.g., a pedestrian section) and a section in which positioning is not necessary (e.g., a desk or a wall) by considering an indoor map on which positioning is performed.

Figure 4:
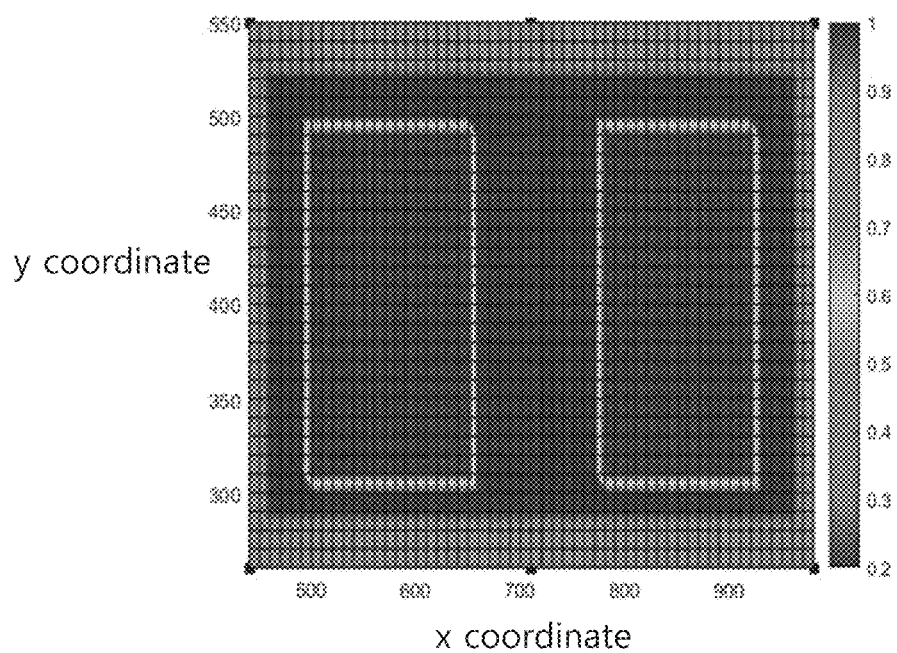
FIG. 4 is a diagram illustrating a positioning section weight map.

FIG. 4 is an example of a positioning section weight map. The positioning section weight map is a Heatmap in which weights are assigned to positioning sections based on information obtained from a map in which a space, that is, a basis for positioning, is indicated. The step of correcting a weight using the positioning section weight map is described below with reference to FIG. 4.

In the positioning section weight map of FIG. 4, a red portion indicates a section in which positioning needs to be intensively performed. A blue portion indicates a section in which positioning is not necessary. A degree of necessary positioning execution may be digitized. Accordingly, a weight is assigned to each positioning section. A positioning error can be corrected when a particle filter algorithm is performed using the weight. Location tracking may be performed by combining a weight in the indoor map with the weight of each of the particles 220 derived through the measurement step. In this case, although a particle 220 has been evaluated to have a high weight through the measurement step, if the particle 220 is placed in a place not a moving path, the weight may be attenuated and incorporated in positioning results. Through such a step, as a result, there is an effect in that a positioning error is improved.

Figure 5:
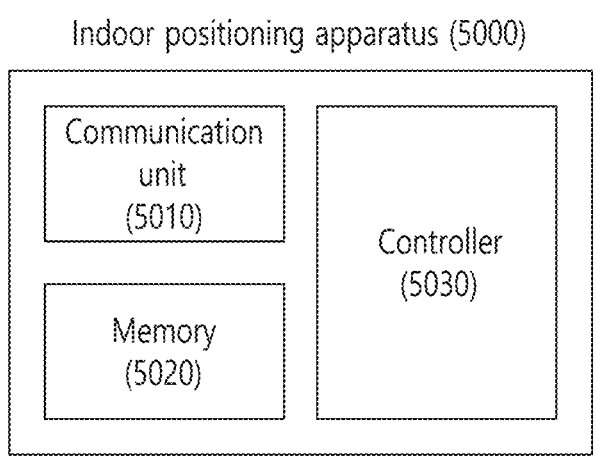
FIG. 5 is a diagram illustrating a block diagram of an indoor positioning apparatus using a particle filter based on an RSSI according to an embodiment of the present disclosure.

FIG. 5 is a block diagram of the indoor positioning apparatus 5000 using a particle filter based on an RSSI according to an embodiment of the present disclosure.

The indoor positioning apparatus using a particle filter based on an RSSI may include various hardware means for properly performing at least one of the aforementioned functions.

For example, as illustrated in FIG. 5, the indoor positioning apparatus 5000 includes a communication unit 5010 for transmitting and receiving signals, a memory 5020 for storing data, and a controller 5030 for controlling the communication unit and the memory. The controller 5030 implements functions, processes and/or methods proposed in the present disclosure. The memory 5020 is connected to the controller 5030 and stores various types of information. The communication unit 5010 is connected to the controller 5030 and transmits and/or receives a radio signal.

Figure 6:
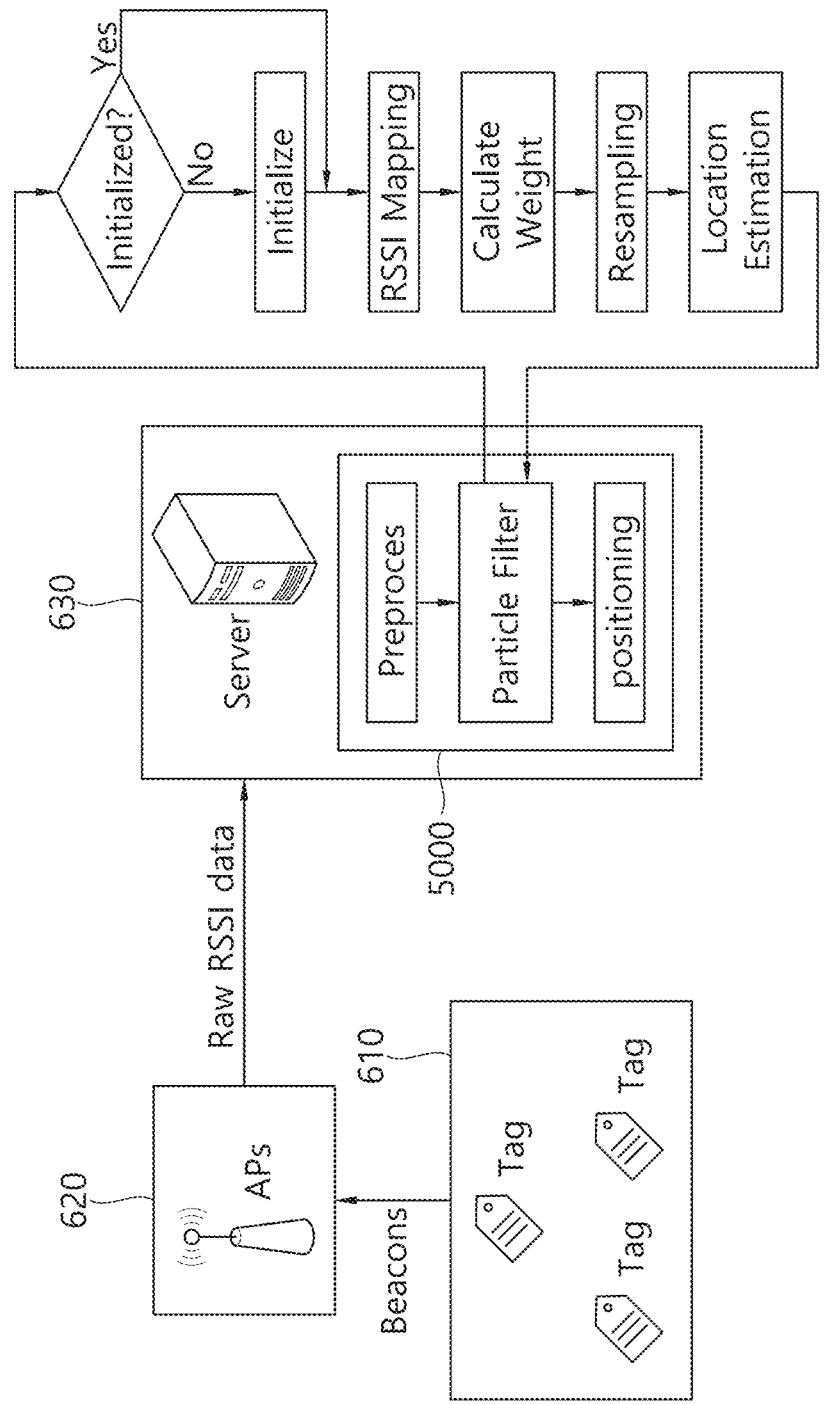
FIG. 6 shows the configuration of an indoor positioning system using a particle filter for beacon tag tracking according to another embodiment of the present disclosure.

FIG. 6 shows the configuration of an indoor positioning system using a particle filter for beacon tag tracking according to another embodiment of the present disclosure.

As illustrated in FIG. 6, the indoor positioning system using a particle filter for beacon tag tracking according to an embodiment of the present disclosure includes a tag 610, an access point (AP) 620 and a server 630. However, all of the illustrated elements are not essential elements. An indoor positioning system having more elements than the illustrated elements may be implemented or an indoor positioning system having less elements than the illustrated elements may be implemented.

An embodiment of the present disclosure relates to an indoor positioning system (IPS) for estimating a location indoors using a tag that propagates a beacon message or a smartphone. The indoor positioning system according to an embodiment of the present disclosure collects RSSI information preprocessed by the Kalman filter and then estimates the location of a tag using the particle filter.

Hereinafter, a detailed construction and operation of each of the elements of the indoor positioning system illustrated in FIG. 6 are described.

The tag 610 broadcasts a beacon message. The tag may periodically broadcast a message, including the ID of a beacon, a medium access control (MAC) address, and RSSI information.

The AP 620 receives a beacon and transmits ID and location information of the AP to the server 630. For example, the APs may be disposed at four corners within an indoor room. The APs receive beacon messages broadcasted by the tags and transmit the received beacon messages to the server.

The server 630 may include the indoor positioning apparatus using a particle filter for beacon tag tracking according to another embodiment of the present disclosure or may be configured to be integrated with the indoor positioning apparatus.

The indoor positioning apparatus preprocesses RSSI information from the tag, which is received from the AP that is located indoors. Furthermore, the indoor positioning apparatus resamples each of particles by comparing a third distance value between the tag and the AP, calculated based on the preprocessed RSSI information, and a fourth distance value between each of the particles and the AP, calculated based on a particle filter distributed indoors. Next, the indoor positioning apparatus estimates an approximated location of the tag from each of the resampled particles. Thereafter, the indoor positioning apparatus tracks the estimated approximated location of the tag.

Hereinafter, an indoor positioning operation performed by the indoor positioning apparatus is specifically described.

As illustrated in FIG. 6, K tags are disposed, and J APs collect RSSI data. The disposed APs j∈{1 . . . J} are represented as Pj. Initially, N particles are generated and uniformly distributed to an indoor environment.

The indoor positioning apparatus according to another embodiment of the present disclosure receives RSSI data received from a smartphone or a tag through the AP, and preprocesses the received RSSI data using the Kalman filter.

Thereafter, the indoor positioning apparatus filters the preprocessed RSSI data using the particle filter.

The indoor positioning apparatus measures a third distance value between a tag k∈{1 . . . K} and an AP j∈{1 . . . J} based on a practical RSSI mapping function using the preprocessed RSSI data in a time t.

The third distance determines the location of a particle i∈{1 . . . N}. Accordingly, the indoor positioning apparatus can precisely calculate a fourth distance value between the particle i and the AP j.

In order to better represent a distance between the distances, an estimated third distance value $\hat{d}_{k,j}{}^t$ between the AP j and the tag k and an accurate fourth distance value $d(P_i{}^t, P_j)$ between the AP j and the particle i may be normalized as in Equation 7.

$$\hat{z}_{k,j}{}^t = \hat{d}_{k,j}{}^t / \hat{d}_{max},$$

$$z_{i,j}{}^t = d(P_i{}^t, P_j) \tag{7}$$

In Equation 7, $\hat{z}_{k,j}{}^t$ and $z_{i,j}{}^t$ indicate a normalized third distance value and a normalized fourth distance value, respectively. Pi and Pj indicate the location of the AP and the location of the particle, respectively.

The weight $w_i{}^t$ of the particle i may be obtained as in Equation 8 by the two distance equations normalized as in Equation 7. $\hat{d}_{max}$ and $d_{max}$ indicate an estimated maximum distance and a set indoor maximum distance, respectively. That is, $\hat{d}_{max}$ is a maximum distance conversion value on which a given AP can detect a tag. $d_{max}$ is a maximum distance between a given particle and a given tag with respect to all particles now generated in an indoor space. In Equation 8, J denotes the number of APs.

$$\omega_i^t = \frac{1}{J}\left(1 - \sum_{j=1}^{J}(|z_{i,j}^t - \hat{z}_{k,j}^t|)\right) \tag{8}$$

The indoor positioning apparatus uses the SUS scheme or a weight-based unbiased sampling scheme in order to resample a particle having a high weight using the weight of each of the particles i in the time t so that the probability that the particle having a high weight will be duplicated is increased. The indoor positioning apparatus may resample each of the particles using the weight-based unbiased sampling scheme so that a particle having a lower weight than a preset threshold is selected with a probability smaller than a preset probability value although the probability that a particle having a higher weight than the preset threshold will be duplicated using each of calculated particle weights is higher.

Alternatively, the indoor positioning apparatus may use the roulette wheel selection scheme in order to resample a particle having a high weight using the weight of each of the particles i in the time t so that the probability that the particle having a high weight will be duplicated is increased.

A tag k estimated in the time t is located at the center of each of the resampled particles. This is normalized and represented as in Equation 9.

$$\hat{P}_k^t = \frac{1}{N}\sum_{i=1}^{N} P_i^t \tag{9}$$

In Equation 9, $P_i{}^t$ denotes the location of an i-th tag in the time t. $\hat{P}_k{}^t$ denotes the location of the normalized tag k. N denotes the number of particles used to estimate the location of the tag k.

As described above, the indoor positioning apparatus preprocesses RSSI information using the Kalman filter and approximates tags within a room using the particle filter algorithm. The indoor positioning apparatus may collect all of pieces of information from the AP, and may estimate the location of an object within the room.

Figure 7:
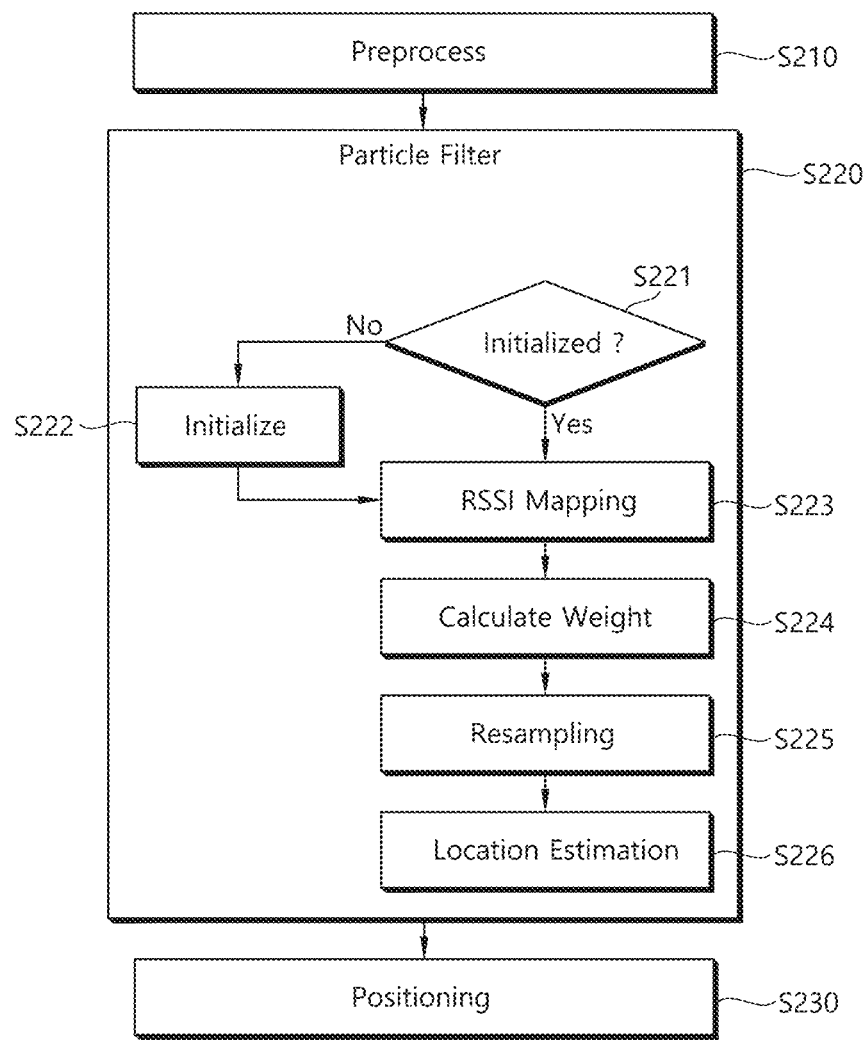
FIG. 7 is a flowchart of an indoor positioning method using a particle filter for beacon tag tracking according to another embodiment of the present disclosure.

FIG. 7 is a flowchart of an indoor positioning method using a particle filter for beacon tag tracking according to another embodiment of the present disclosure.

The indoor positioning apparatus according to another embodiment of the present disclosure preprocesses RSSI information of a tag received from an AP that is positioned indoors (S210). In this case, the indoor positioning apparatus may filter out noise from the received RSSI information using the Kalman filter. The indoor positioning apparatus may estimate an RSSI value calculated based on a Kalman gain from the received RSSI information based on an error covariance to be used for next estimation and the update of a current state.

The indoor positioning apparatus may resample each of particles by comparing a third distance value between the tag and the AP, calculated based on the preprocessed RSSI information, and a fourth distance value between each of the particles and the AP, calculated based on particle filters distributed indoors, and estimates an approximated location of the tag based on the location of each of the resampled particles (S220).

Detailed steps S221 to S225 of step S220 are described below.

The indoor positioning apparatus checks whether an initialization operation for indoor positioning has been performed (S221).

If, as a result of the check (S221), the initialization operation for indoor positioning has not been performed, the indoor positioning apparatus performs the initialization operation for performing an indoor size setting operation, a coordinate setting operation of the AP within a room, and an operation of generating and distributing a plurality of particles (S222).

Thereafter, in the state in which the initialization operation for indoor positioning has been performed, the indoor positioning apparatus calculates a third distance value between the tag and the AP through an RSSI mapping operation using the preprocessed RSSI information and a fourth distance value between each of particles and the AP, calculated based on particle filters that are distributed indoors (S223). The indoor positioning apparatus may normalize each of the third distance value and the fourth distance value as the size of the interior.

Furthermore, the indoor positioning apparatus calculates the weight of each of the particles distributed indoors based on a difference value between the third distance value and the fourth distance value (S224).

Next, the indoor positioning apparatus resamples each of the particles based on each of the calculated particle weights (S225).

Furthermore, the indoor positioning apparatus estimates the center of each of the resampled particles as the location of the tag (S226).

Thereafter, the indoor positioning apparatus tracks an approximated location of the estimated tag (S230).

Figure 8:
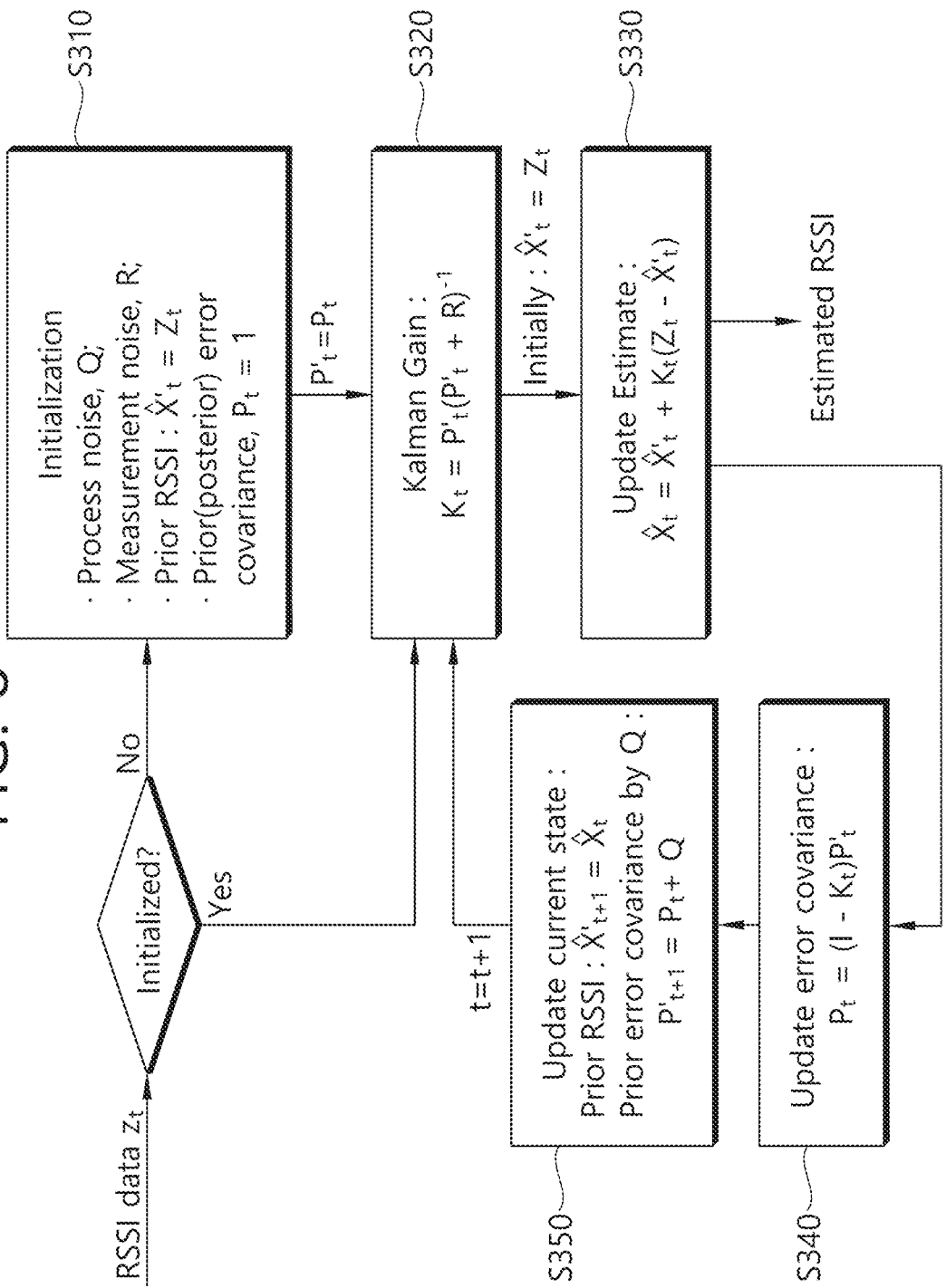
FIG. 8 is a diagram illustrating a process of preprocessing RSSI information using a Kalman filter in the indoor positioning method according to another embodiment of the present disclosure.

FIG. 8 is a diagram illustrating a process of preprocessing RSSI information using the Kalman filter in the indoor positioning method according to another embodiment of the present disclosure.

The indoor positioning apparatus receives RSSI data $Z_t$ and checks whether an initialization operation has been performed.

If the initialization operation has not been performed, the indoor positioning apparatus performs the initialization operation on process noise Q, measurement noise R, a prior RSSI $\hat{X}_t^i = Z_t$, and prior error covariance Pt=1 (S310).

Furthermore, the indoor positioning apparatus calculates a Kalman gain like $K_t = P_t'(P_t' + R)^{-1}$ (S320).

Next, the indoor positioning apparatus performs an RSSI update estimate like $\hat{x}_t = \hat{x}_t' + K_t(z_t - \hat{x}_t')$ (S330).

Thereafter, the indoor positioning apparatus performs an error covariance update (i.e., update error covariance) (S340).

Furthermore, the indoor positioning apparatus performs a current state update (i.e., update the current state) on the prior error covariance based on the prior RSSI and the process noise Q (S350).

Figure 9:
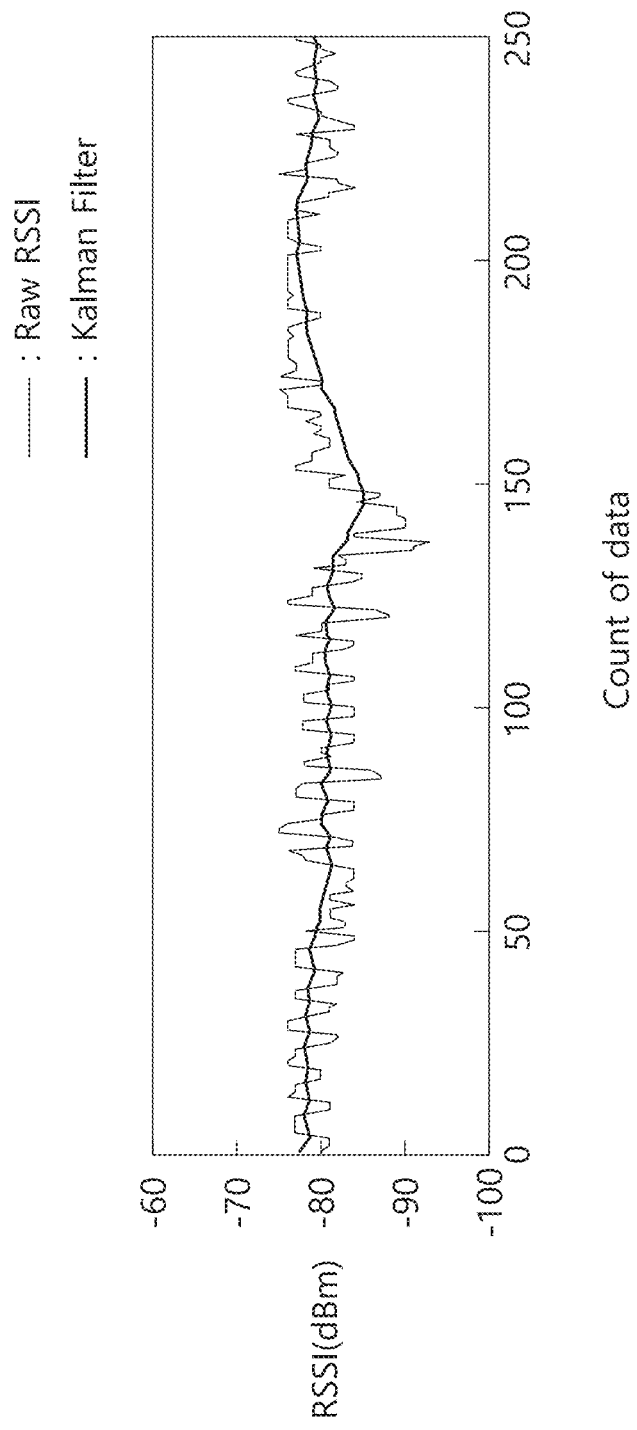
FIG. 9 is a diagram illustrating RSSI data preprocessed by the Kalman filter in the indoor positioning method according to another embodiment of the present disclosure.

FIG. 9 is a diagram illustrating RSSI data preprocessed by the Kalman filter in the indoor positioning method according to another embodiment of the present disclosure.

As illustrated in FIG. 9, the indoor positioning apparatus may make smooth RSSI data by filtering RSSI data using the Kalman filter.

Figure 10:
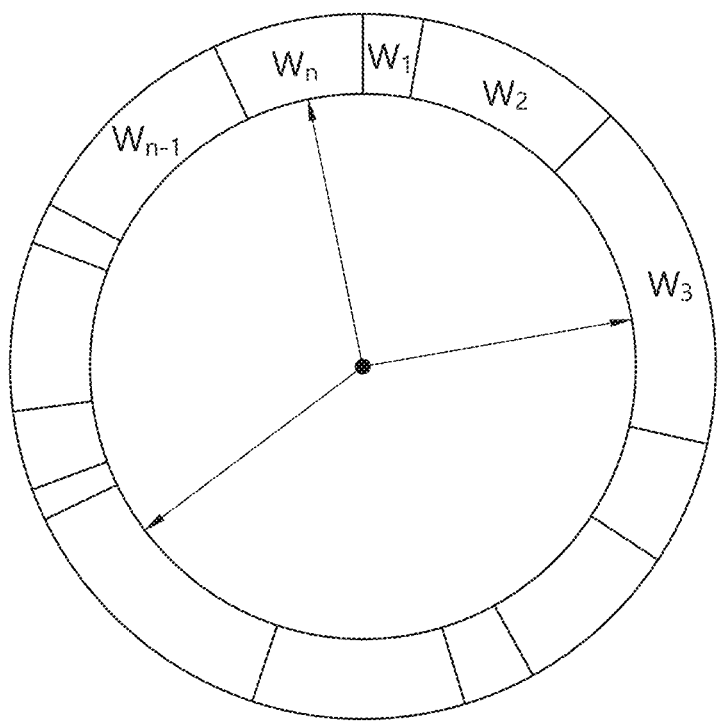
FIGS. 10 and 11 are diagrams illustrating a roulette wheel selection scheme used in the indoor positioning method according to another embodiment of the present disclosure.
Figure 11:
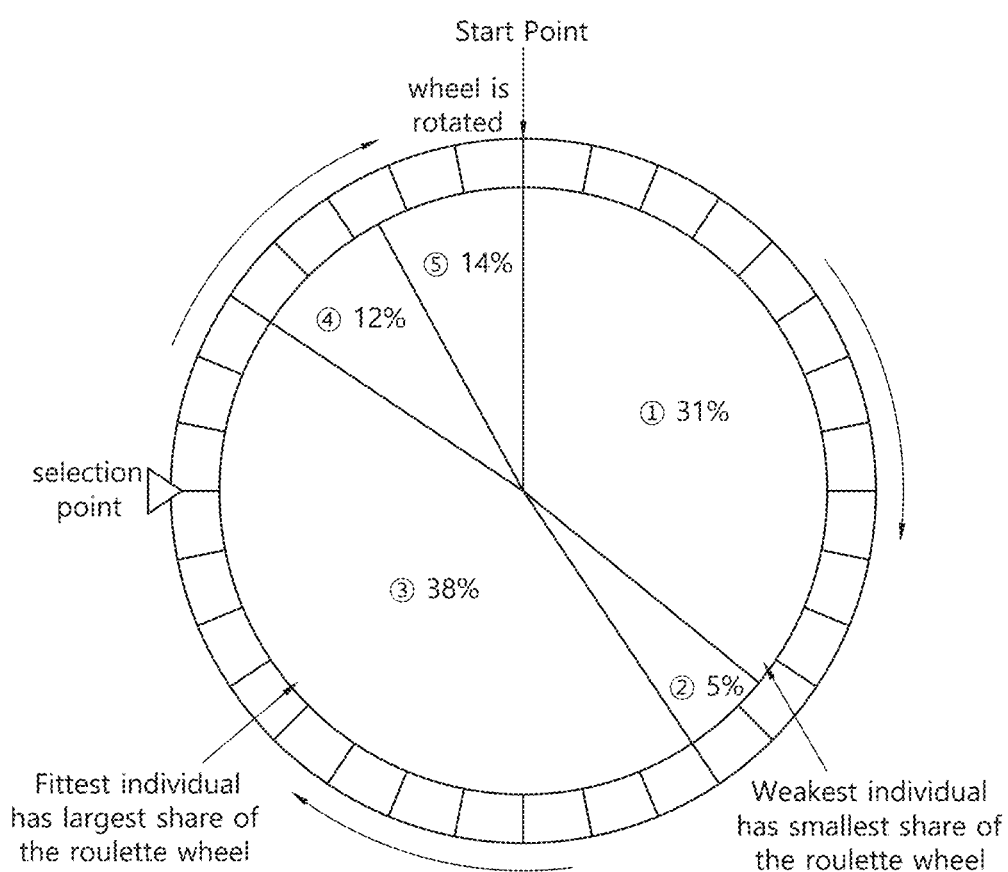

FIGS. 10 and 11 are diagrams illustrating the roulette wheel selection scheme used in the indoor positioning method according to another embodiment of the present disclosure.

For example, as illustrated in FIGS. 10 and 11, the indoor positioning apparatus may resample each of particles using the roulette wheel selection scheme based on a random number between a start point and a preset section so that the probability that a particle having a high weight will be duplicated is increased using the calculated weight of each of particles. The roulette wheel selection scheme performs binary search.

For example, the states of five particles are P1: 31%, P2: 5%, P3: 38%, P4: 12%, and P5: 14%, respectively, and a total probability is 100%. The probabilities that the five particles will be selected are 0.31, 0.05, 0.38, 0.12, and 0.14, respectively.

Upon resampling operation, new five particles are generated again. A random number "x" between [0, 1] is generated. A particle at the location of the start point+x is sampled.

Figure 12:
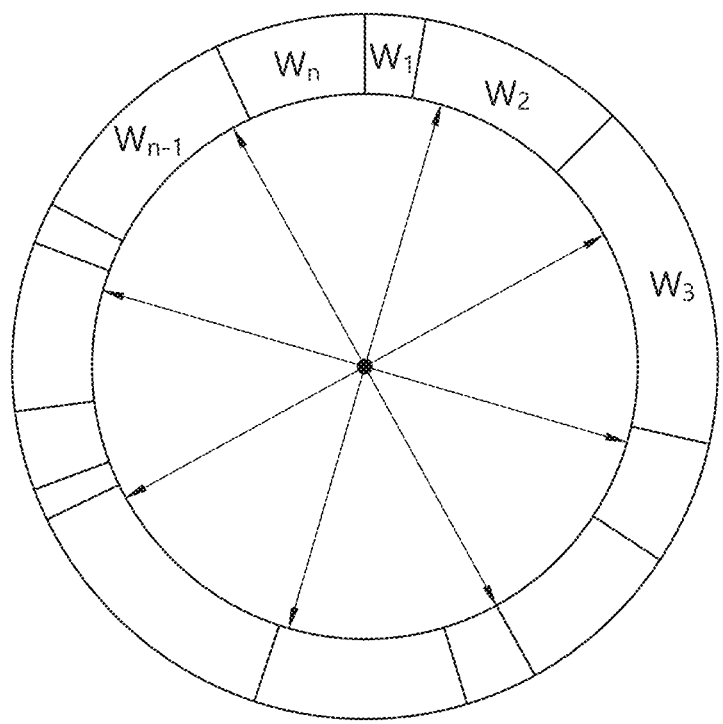
FIGS. 12 and 13 are diagrams illustrating an SUS scheme used in the indoor positioning method according to another embodiment of the present disclosure.
Figure 13:
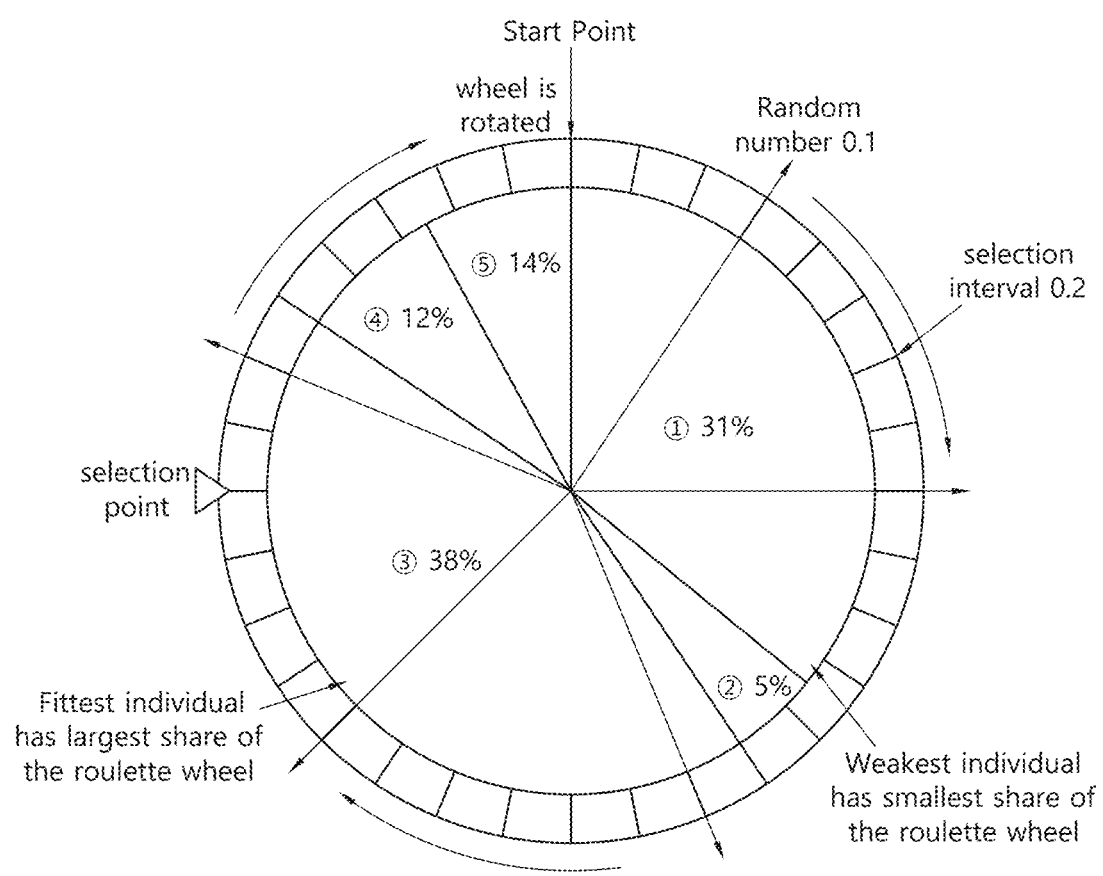

FIGS. 12 and 13 are diagrams illustrating the stochastic universal sampling (SUS) scheme used in the indoor positioning method according to another embodiment of the present disclosure.

For another example, the indoor positioning apparatus may resample each of particles using the SUS scheme based on a random number between a selection interval and a preset section so that the probability that a particle having a high weight will be duplicated is increased using the calculated weight of each of particles.

For example, the states of five particles are P1: 31%, P2: 5%, P3: 38%, P4: 12%, and P5: 14%, respectively, and a total probability is 100%. The probabilities that the particles will be selected are 0.31, 0.05, 0.38, 0.12, and 0.14, respectively.

Upon resampling operation, new five particles are generated again. The selection interval is 0.2 because it is ⅕. An initial number is a random number between [0, 0.2].

Figure 14:
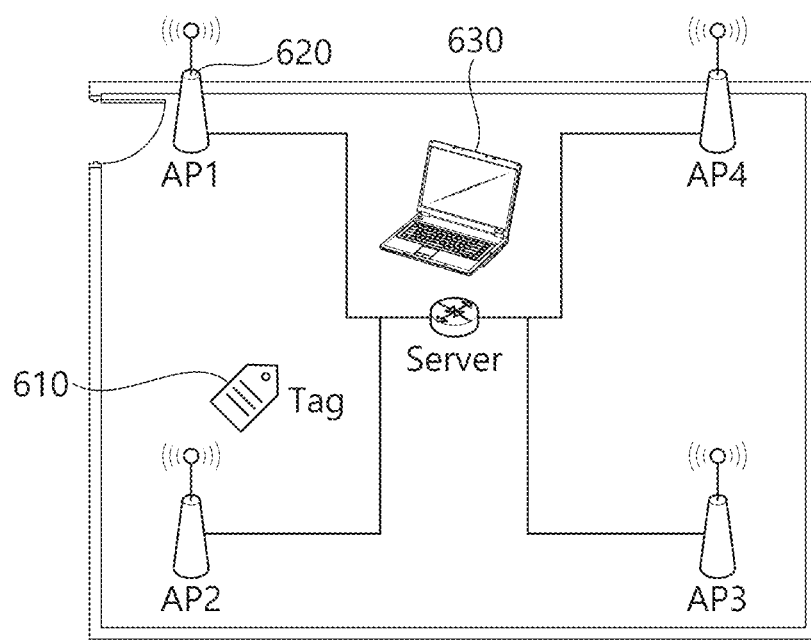
FIG. 14 is a diagram illustrating a configuration for the test bed of an implementation system for evaluating performance according to another embodiment of the present disclosure.

FIG. 14 is a diagram illustrating a simulation configuration for evaluating performance according to another embodiment of the present disclosure.

As illustrated in FIG. 14, in order to evaluate performance according to another embodiment of the present disclosure in an actual environment, an experiment environment was constructed like the simulation configuration. FIG. 14 illustrates an experiment environment configuration. In the experiment, four Raspberry Pi 4B boards were used as basis devices. A server is configured to have a WiFi router function. Four APs is connected to the server WiFi in order to collect beacon signals from tags. RSSI data for tracking the location of a tag, monitored through experiments by an indoor positioning system according to another embodiment of the present disclosure, may be transmitted to the server.

In order to verify the indoor positioning system according to another embodiment of the present disclosure, a 20 m×10 m virtual simulation space was constructed using Python, four APs were disposed at the four corners of a room, and one tag was placed within the room.

Figure 15:
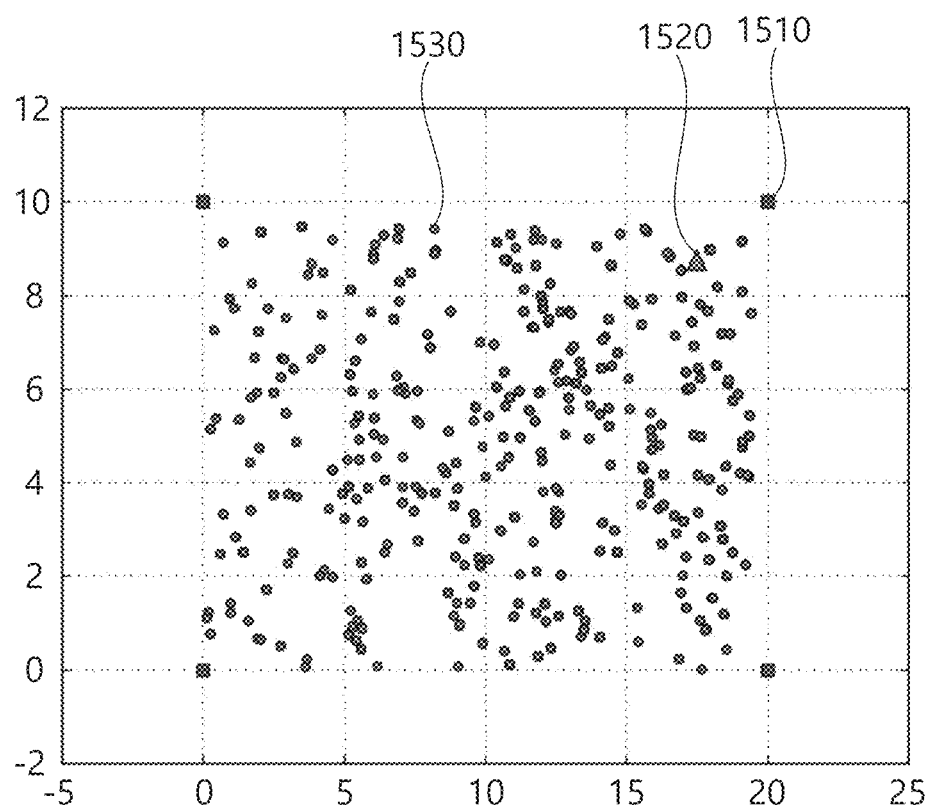
FIGS. 15 and 16 are diagrams illustrating experiment results of a simulation configuration for evaluating performance according to another embodiment of the present disclosure.
Figure 16:
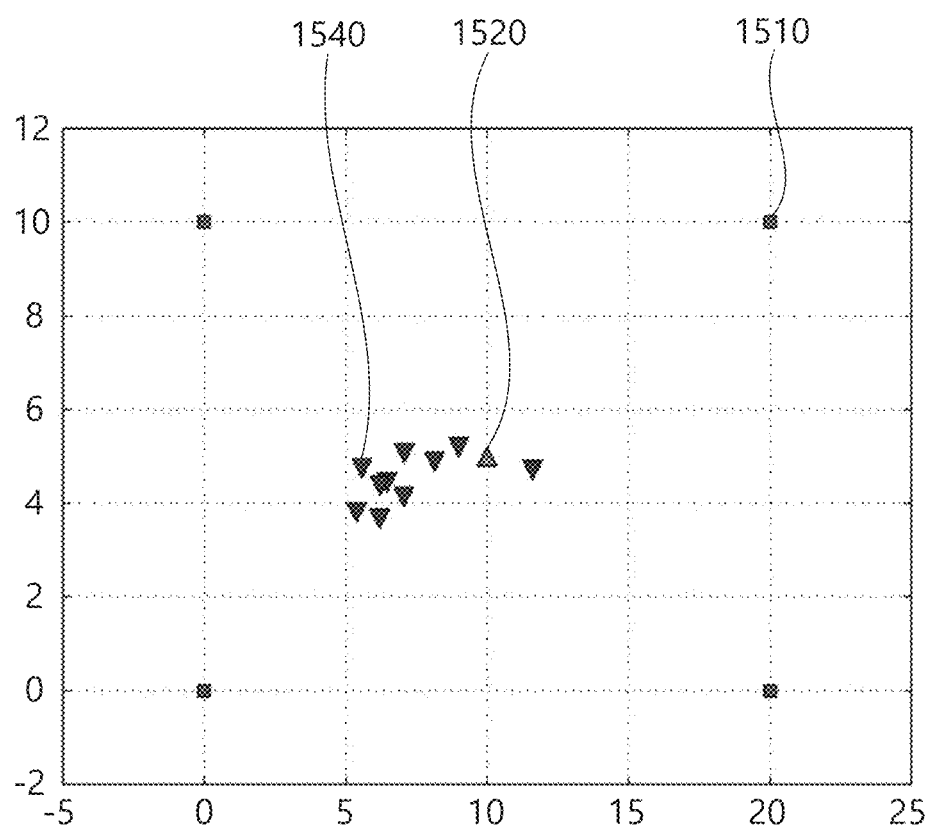

FIGS. 15 and 16 are diagrams illustrating experiment results of a simulation configuration for evaluating performance according to another embodiment of the present disclosure.

In order to measure an error occurring when RSSI data is measured, the influence of noise was simulated by adding a random value based on a Gaussian distribution (N(0,1)). FIGS. 15 and 16 illustrate the results of the simulations.

A yellow square 1510 indicates the location of an AP. A red triangle 1520 indicates the actual location of a tag. A blue circle 1530 indicates the location of a particle. A green triangle 1540 indicates the location of a tag estimated by the indoor positioning system according to another embodiment of the present disclosure. In FIG. 15, the blue circles indicate particles uniformly distributed at the early stage of the simulations.

As illustrated in FIG. 16, accuracy was evaluated about 5 m as the results of the simulations of the indoor positioning system according to another embodiment of the present disclosure.

FIGS. 17 to 28 are diagrams illustrating various experiment results of simulation configurations for evaluating performance according to another embodiment of the present disclosure.

In another embodiment of the present disclosure, two sets of RSSI data may be collected in vertical and horizontal directions.

In FIGS. 17 to 28, a yellow square 1510 indicates the location of an AP. A red triangle 1520 indicates the actual location of a tag. A blue circle 1530 indicates the location of a particle. A green triangle 1540 indicates the location of a tag estimated by the indoor positioning system according to another embodiment of the present disclosure.

Figure 17:
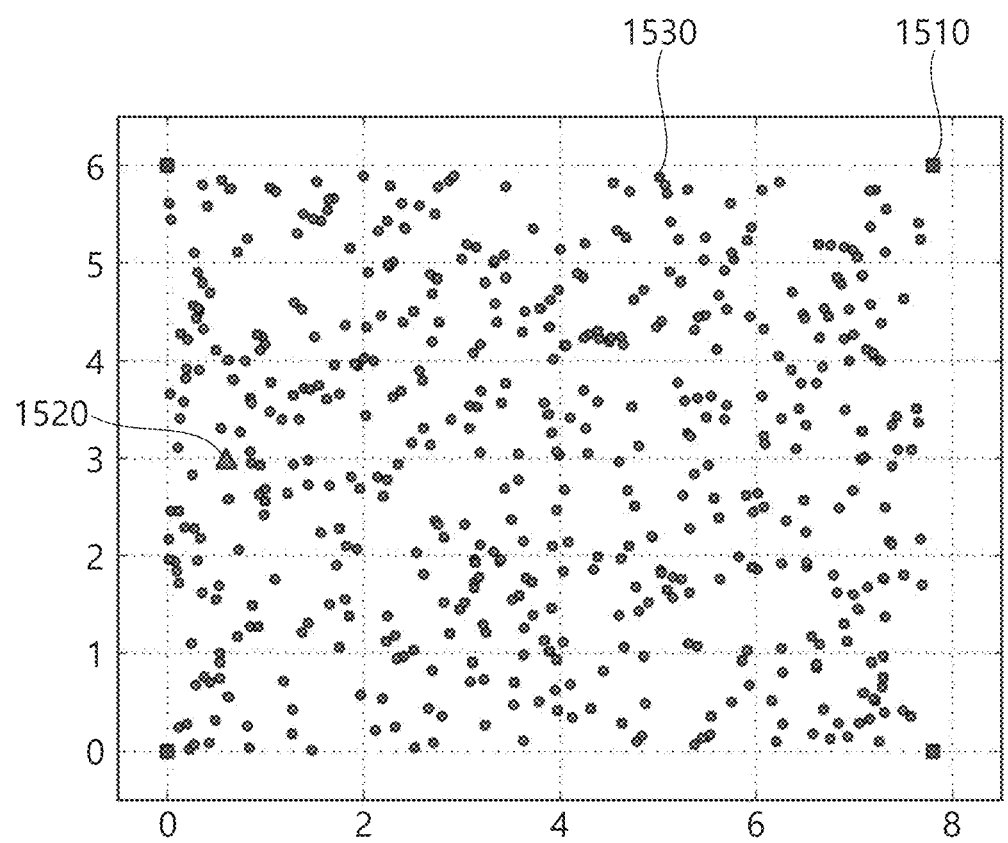
FIGS. 17 to 28 are diagrams illustrating various experiment results in the test bed of an implementation system for evaluating performance according to another embodiment of the present disclosure.
Figure 18:
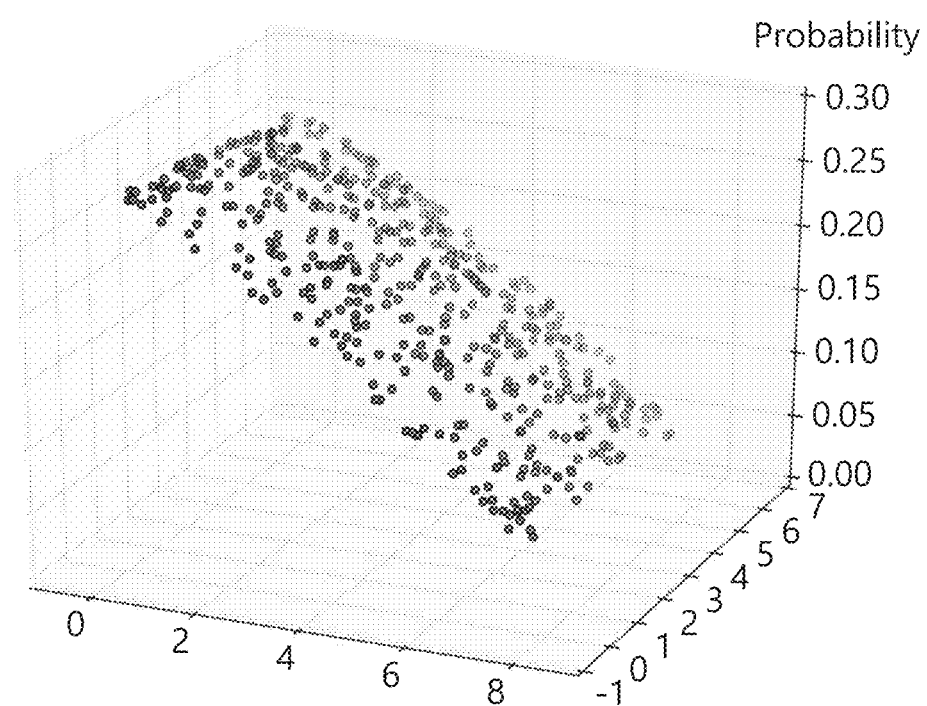

If the actual location of a tag has (0.6, 3.0) coordinates, that is, the red triangle 1520, simulation results of a $1^{st}$ step are illustrated in FIG. 17. In this case, the probability of each of the particles distributed indoors is illustrated in FIG. 18.

It can be seen that the particle has a lower probability as the particle becomes distant from the tag with respect to the actual location of the tag.

Figure 19:
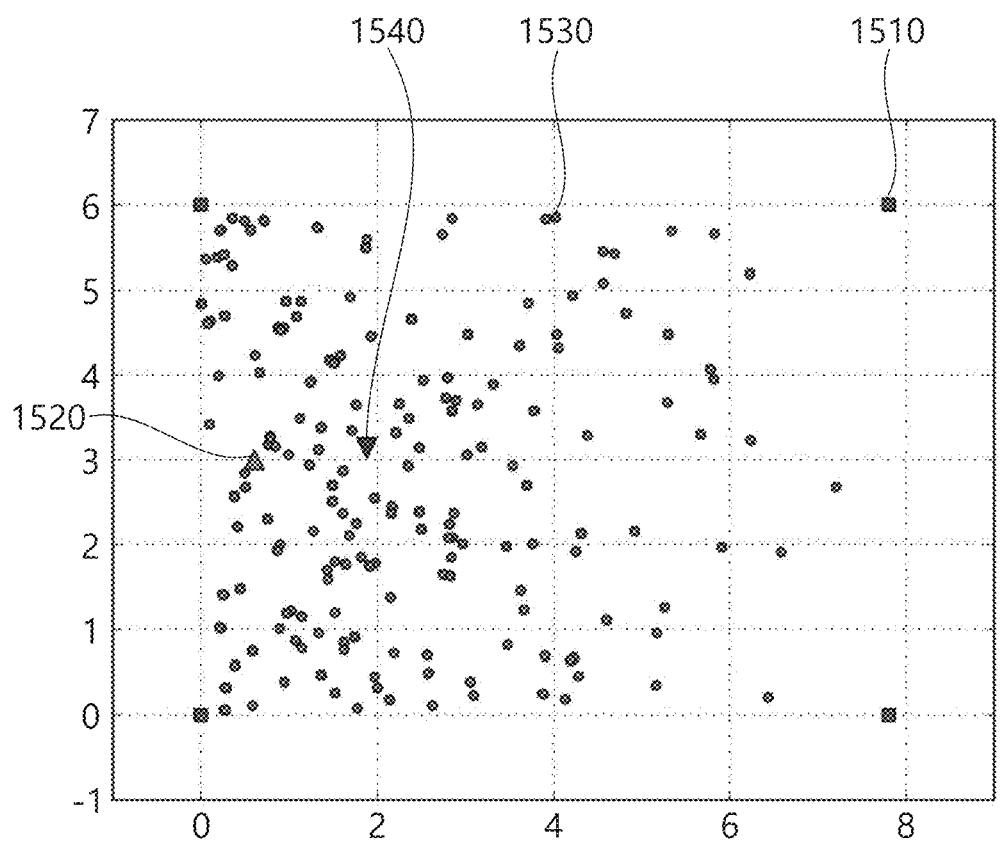
Figure 20:
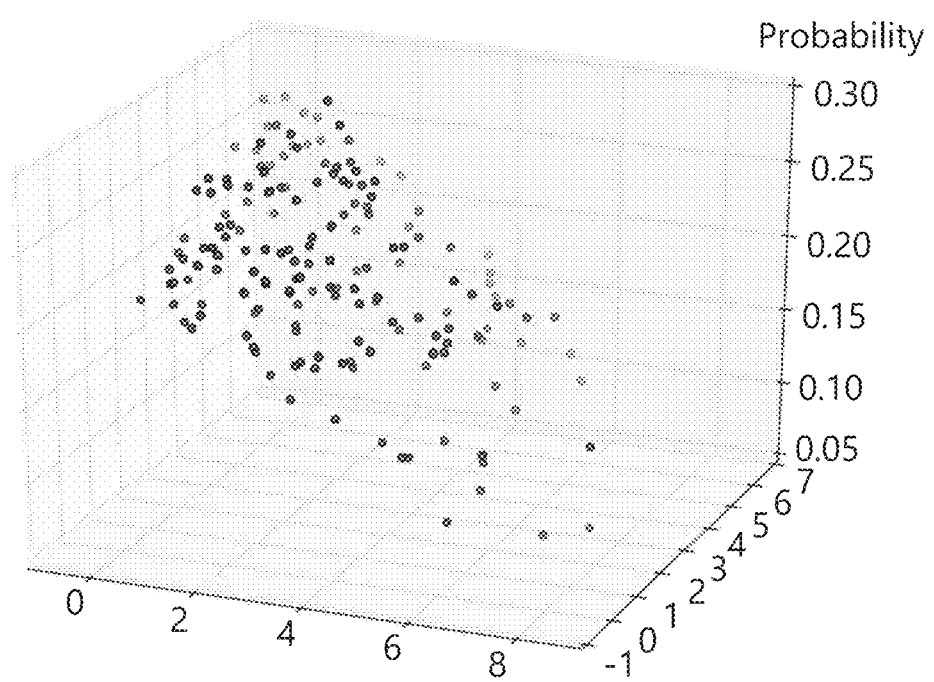

If the actual location of the tag has (0.6, 3.0) coordinates, that is, the red triangle 1520, simulation results of a $5^{th}$ step through the resampling of each of the particles are illustrated in FIG. 19. In this case, the probability of each of the particles distributed indoors is illustrated in FIG. 20. It can be seen that the number of resampled particles is reduced and the probability is lowered as the particle becomes distant from the tag with respect to the actual location of the tag.

Figure 21:
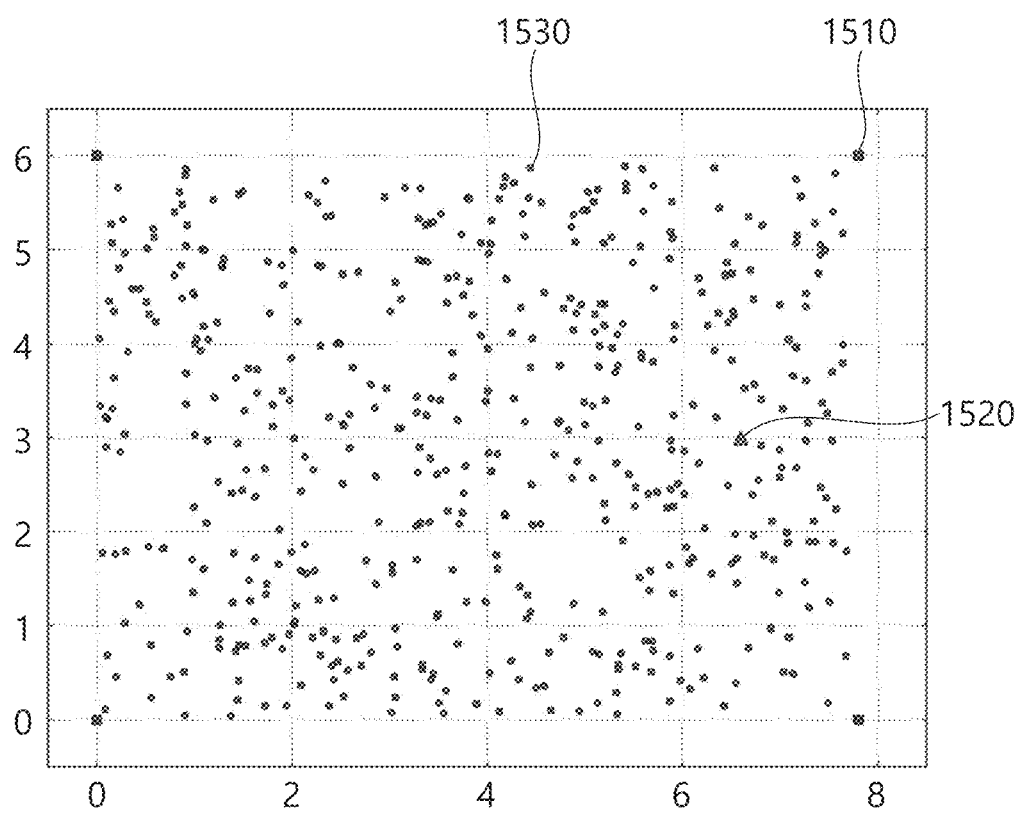
Figure 22:
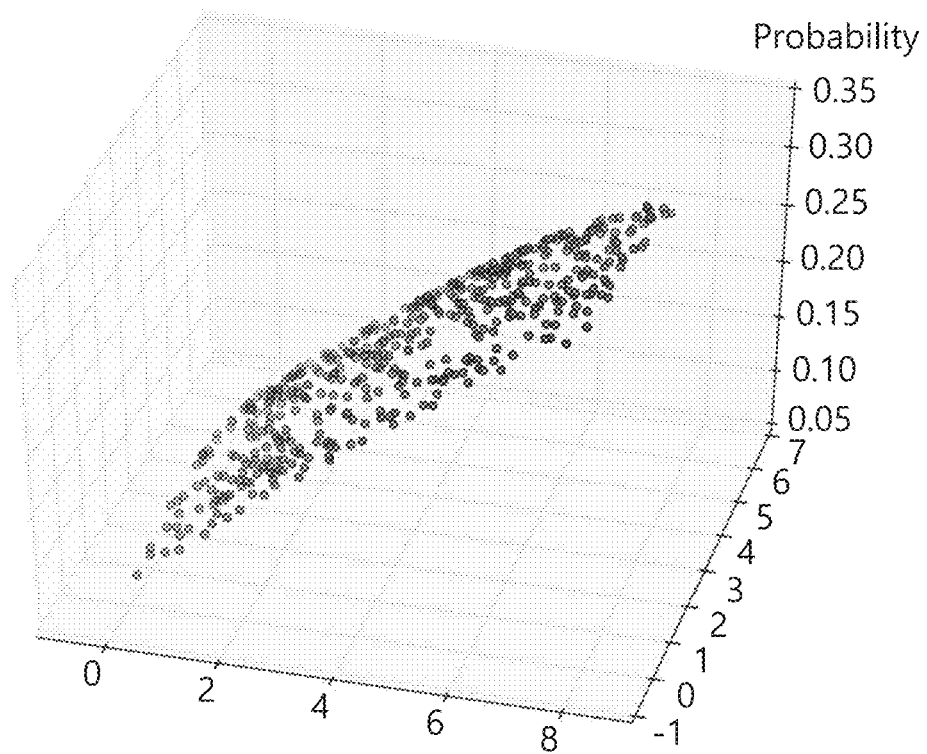

If the actual location of the tag has (6.6, 3.0) coordinates, that is, the red triangle 1520, simulation results of the $1^{st}$ step are illustrated in FIG. 21. In this case, the probability of each of the particles distributed indoors is illustrated in FIG. 22. It can be seen that the particle has a lower probability as it becomes distant from the tag with respect to the actual location of the tag.

Figure 23:
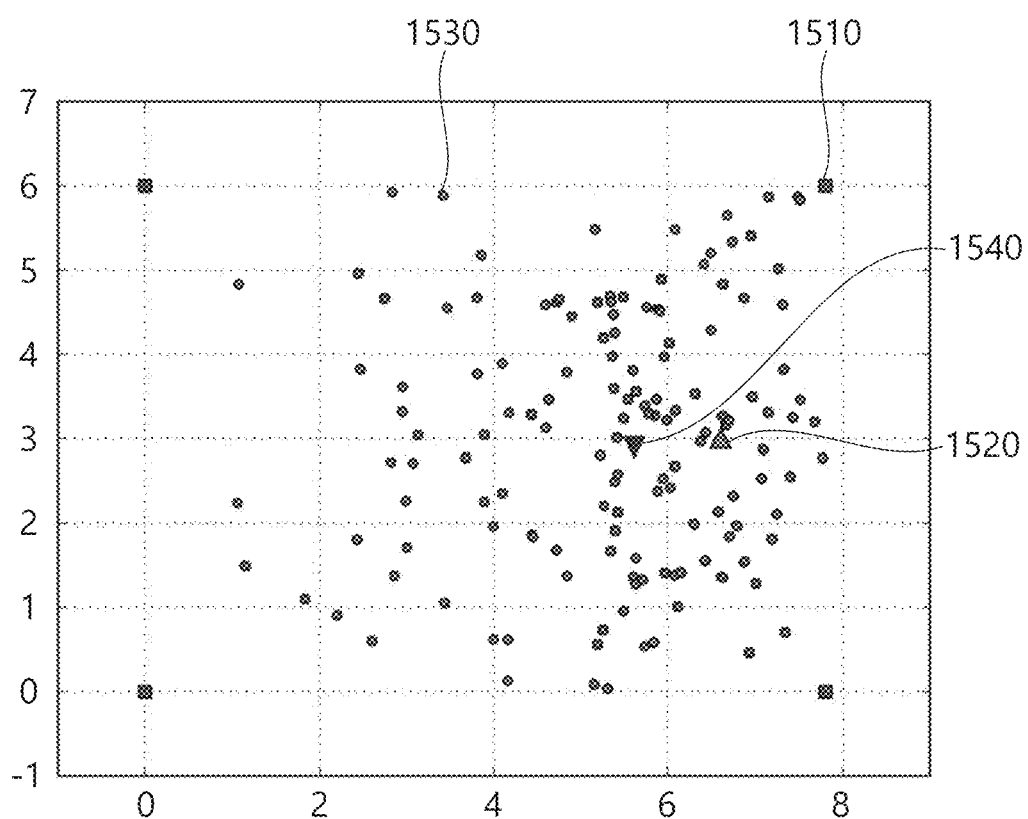
Figure 24:
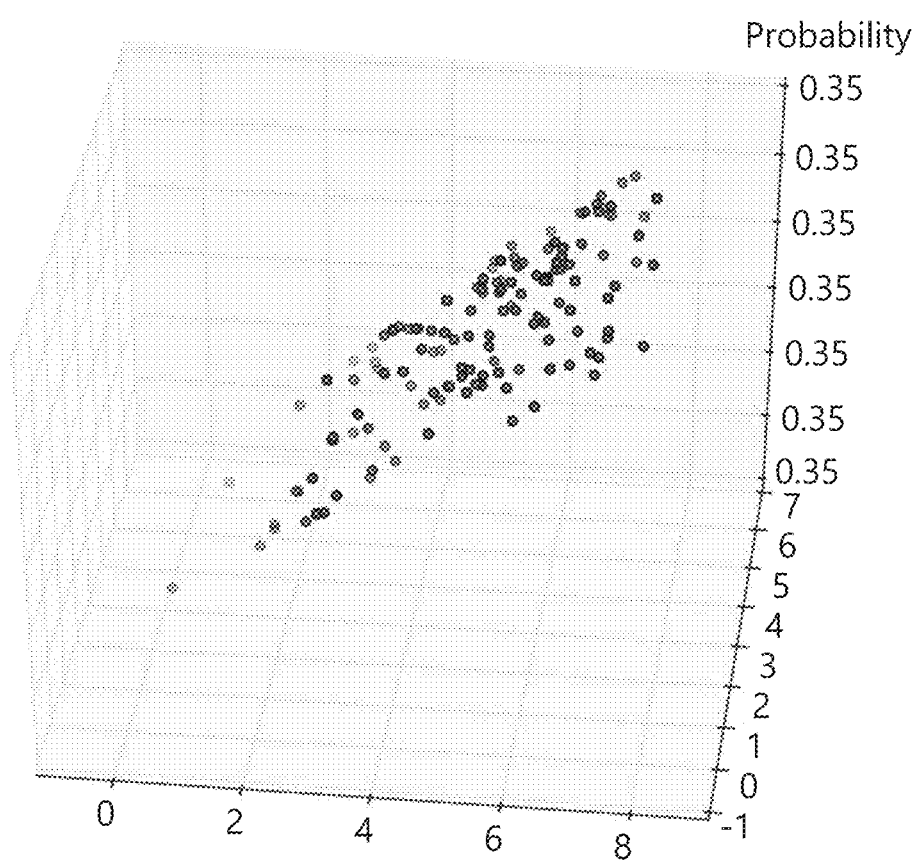

If the actual location of the tag has (6.6, 3.0) coordinates, that is, the red triangle 1520, simulation results of the $5^{th}$ step through the resampling of each of the particles are illustrated in FIG. 23. In this case, the probability of each of the particles distributed indoors is illustrated in FIG. 24. It can be seen that the number of resampled particles is reduced and the probability is lowered as the particle becomes distant from the tag with respect to the actual location of the tag.

Figure 25:
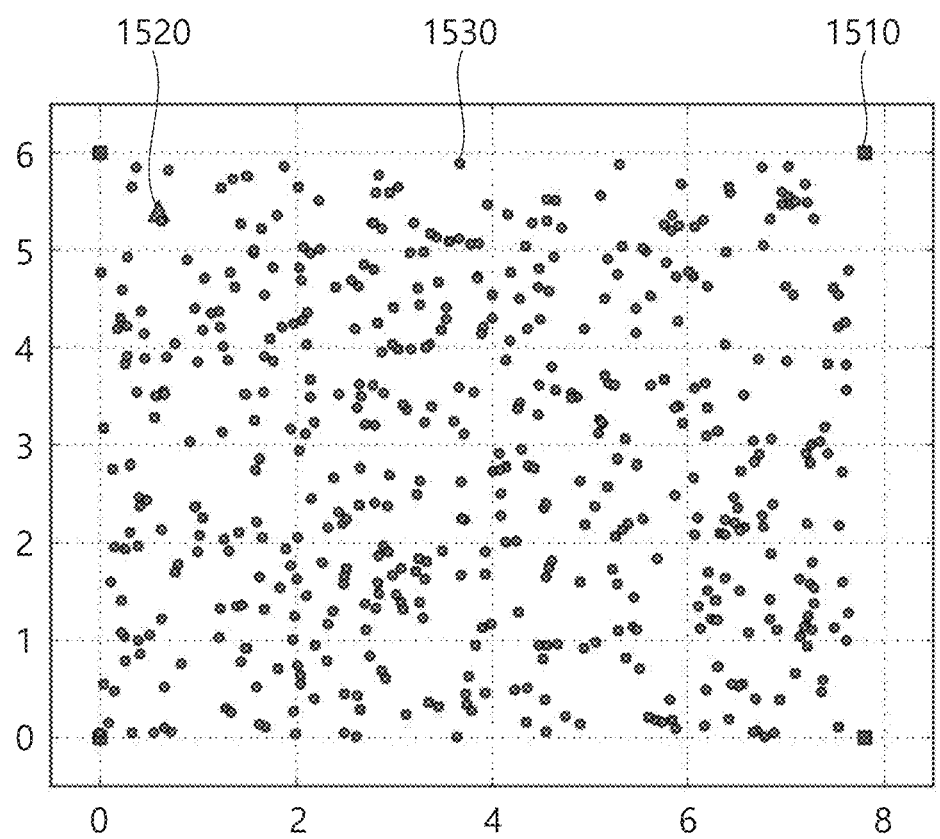
Figure 26:
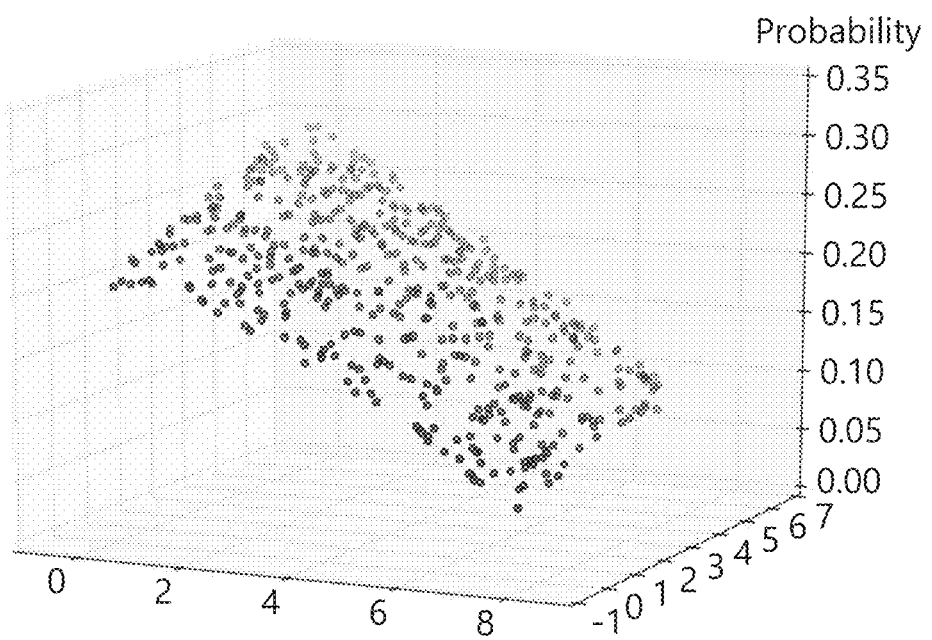

If the actual location of the tag has (6.6, 5.4) coordinates, that is, the red triangle 1520, simulation results of the $1^{st}$ step are illustrated in FIG. 25. In this case, the probability of each of the particles distributed indoors is illustrated in FIG. 26. It can be seen that the particle has a lower probability as it becomes distant from the tag with respect to the actual location of the tag.

Figure 27:
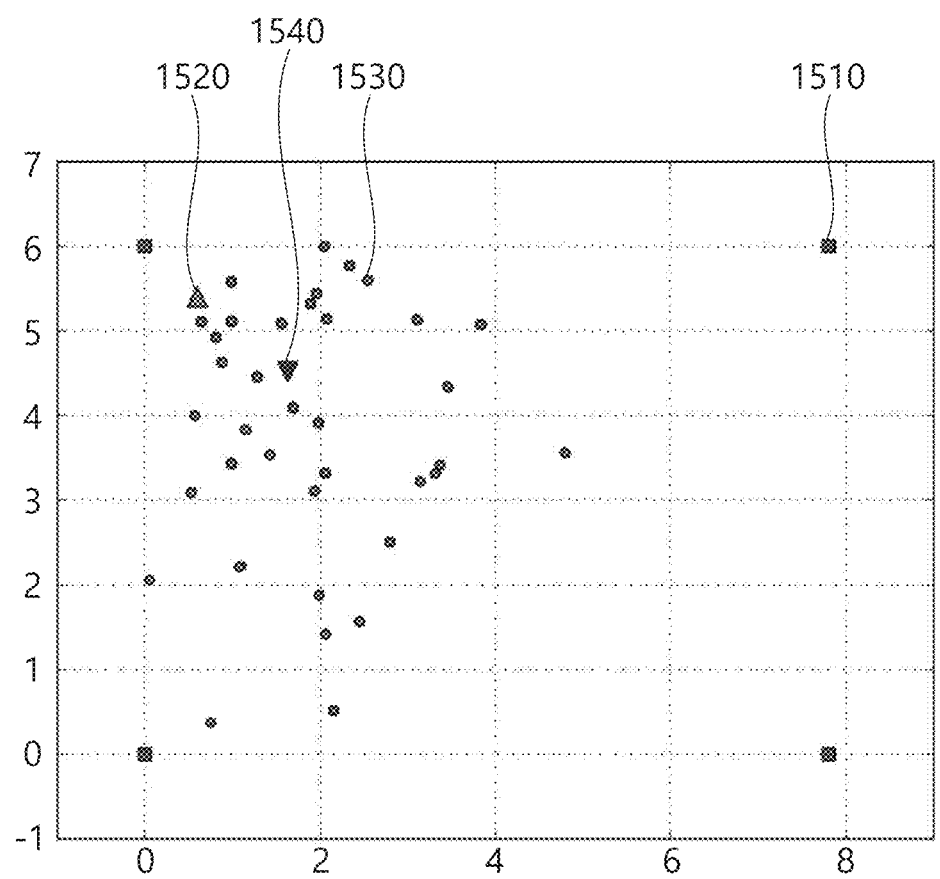
Figure 28:
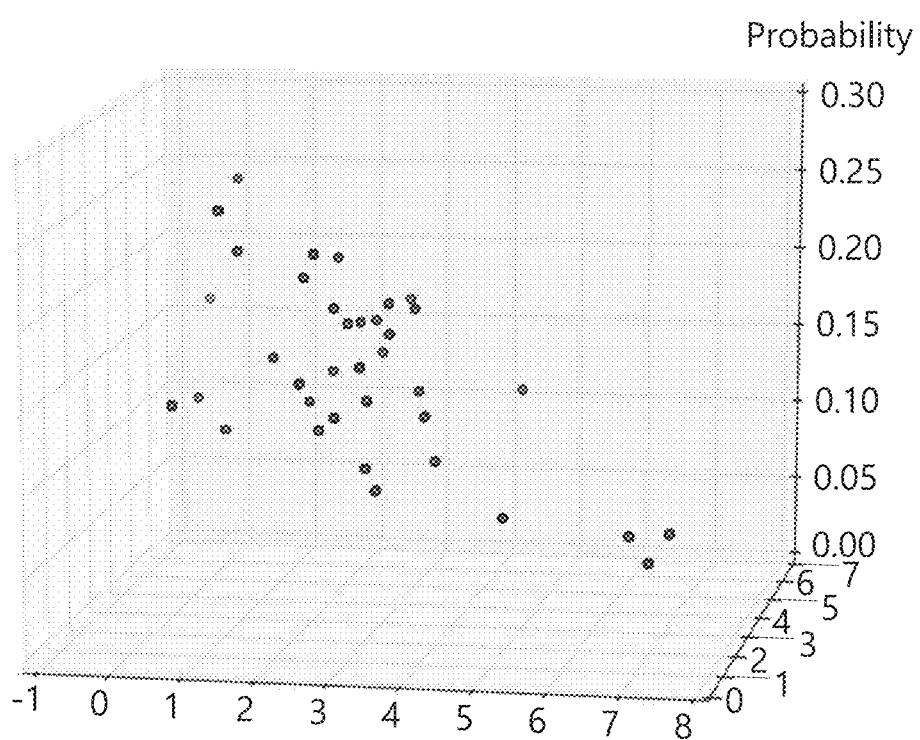

If the actual location of the tag has (6.6, 3.0) coordinates, that is, the red triangle 1520, simulation results of the $5^{th}$ step through the resampling of each of the particles are illustrated in FIG. 27. In this case, the probability of each of the particles distributed indoors is illustrated in FIG. 28. It can be seen that the number of resampled particles is reduced and the probability is lowered as the particle becomes distant from the tag with respect to the actual location of the tag.

An embodiment according to the present disclosure may be implemented by various means, for example, hardware, firmware, software or a combination of them. In the case of an implementation by hardware, an embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

Furthermore, in the case of an implementation by firmware or software, an embodiment of the present disclosure may be implemented in the form of a module, procedure or function for performing the aforementioned functions or operations, and may be stored in recording media readable through various computer means. In this case, the recording media may include program instructions, data files, data structures, etc. solely or in combination. The program instructions recorded in the recording medium may be designed and implemented for the present disclosure or may be known by those of ordinary skill in the computer software field. For example, the recording media may include magnetic media such as a hard disk, a floppy disk and a magnetic tape, optical media such as a compact disc read only memory (CD-ROM) and a digital video disc (DVD), magneto-optical media such as a floptical disk, and a hardware device specially designed to store and execute program instructions such as a ROM, a RAM, and a flash memory. An example of the program instructions includes a high-level language code executable by a computer using an interpreter in addition to a machine code, such as that produced by a compiler. Such a hardware device may be configured to operate as one or more software modules in order to perform an operation of the present disclosure and vice versa.

Furthermore, the device or terminal according to the present disclosure may be driven by an instruction that enables one or more processors to perform the aforementioned functions and processes. For example, such an instruction may include an interpreted instruction or executable code, such as script instructions such as JavaScript or ECMAScript instructions, or other instructions stored in a computer-readable medium. Furthermore, the device according to the present disclosure may be implemented in a distributed form over a network, such as a server farm, or may be implemented in a single computer device.

Furthermore, a computer program (also known as a program, software, a software application, a script, or a code) installed in a device according to the present disclosure and executing a method according to the present disclosure may also be written in any type of a programming language, including a compiled or interpreted language or transcendental procedural language, and may also be exploded in any type including an independent program or module, a component, a subroutine, or other units suitable for being used in a computer environment. The computer program does not necessarily correspond to a file of a file system. The program may be stored within a single file provided to a requested program, within multiple files that interface with each other (e.g., a file that stores part of one or more modules, lower programs or codes), or within part of another program or a file including data (e.g., one or more scripts stored in a markup language document). The computer program may be placed in one site or may be distributed into a plurality of sites and exploded so that the computer program is executed on a single computer or multiple computers connected over a communication network.

According to an embodiment of the present disclosure, the indoor positioning method capable of guaranteeing positioning accuracy even in an indoor environment in which radio signal interference is severe can be used.

Furthermore, according to an embodiment of the present disclosure, an efficient indoor positioning method can be used using the particle filter based on an RSSI.

Furthermore, the embodiments of the present disclosure can minimize damage by allowing persons to evacuate the interior when emergency, such as a fire, an explosion or a natural disaster, occurs because a movement of the persons who have owned tags or smartphones can be monitored.

Effects which may be obtained in the present disclosure are not limited to the aforementioned effects, and other technical effects not described above may be evidently understood by a person having ordinary skill in the art to which the present disclosure pertains from the following description.

Although the drawings have been separated and described for convenience of description, a new embodiment may be implemented by merging the embodiments described with reference to the drawings. Furthermore, the present disclosure is not limitedly applied to the configurations and methods of the aforementioned embodiments, and some of or all the embodiments may be selectively combined so that the embodiments are modified in various ways.

Furthermore, although the preferred embodiments have been illustrated and described above, this specification is not limited to the aforementioned specific embodiments, and a person having ordinary skill in the art to which this specification pertains may modify the present disclosure in various ways without departing from the gist of the present disclosure in the claims. Such modified embodiments should not be individually understood from the technical spirit or prospect of this specification.

What is claimed is:

1. An indoor positioning method of an indoor positioning apparatus using a particle filter based on a received signal strength indicator (RSSI), the method comprising:
   initializing by generating a base map corresponding to an indoor space and distributing a plurality of particles on the base map;
   preprocessing RSSI information of a tag received through an access point positioned in the indoor space;
   resampling each of the particles by comparing a first distance value between the tag and the access point and a second distance value between each of the particles and the access point,
   wherein the first distance value is calculated using the preprocessed RSSI information, and the second distance value is calculated based on a particle filter distributed in the indoor space;
   estimating an approximated location of the tag from a location of each of the resampled particles by calculating a weight of each of the particles distributed in the indoor space based on a difference value between the first distance value and the second distance value; and
   tracking the estimated approximated location of the tag.

2. The indoor positioning method of claim 1, wherein preprocessing the RSSI information comprises filtering out noise of the received RSSI information using a Kalman filter.

3. The indoor positioning method of claim 1, wherein preprocessing the RSSI information comprises estimating an RSSI value by updating an RSSI value, calculated through a Kalman gain based on the received RSSI information, based on an error covariance to be used for next estimation and an update of a current state.

4. The indoor positioning method of claim 1, wherein estimating the location of the tag comprises setting a size of the indoor space, and setting coordinates of an access point in the indoor space.

5. The indoor positioning method of claim 1, wherein estimating the location of the tag comprises normalizing each of the first distance value and the second distance value as a size of the indoor space.

6. The indoor positioning method of claim 1, wherein estimating the location of the tag comprises resampling each of the particles using a weight-based unbiased sampling scheme for selecting a particle having a low weight with a low probability although a probability that a particle having a higher weight is to be duplicated using each of the calculated weights of the particles is increased.

7. The indoor positioning method of claim 1, wherein estimating the location of the tag comprises resampling each of the particles using a stochastic universal sampling (SUS) scheme based on a random number between a selection interval and a preset section so that a probability that a particle having a higher weight is to be duplicated using each of the calculated weights of the particles is increased.

8. The indoor positioning method of claim 1, wherein estimating the location of the tag comprises estimating a center of each of the resampled particles as the location of the tag.

9. An indoor positioning apparatus using a particle filter based on a received signal strength indicator (RSSI), the apparatus comprising:
   a communication unit for transmitting and receiving signals;
   a memory storing data; and
   a controller configured to control the communication unit and the memory,
   wherein the controller is configured to:
      initialize by generating a base map corresponding to an indoor space and distributing particles on the base map;
      preprocess RSSI information of a tag received through an access point positioned in the indoor space;
      resample each of the particles by comparing a first distance value between the tag and the access point and a second distance value between each of the particles and the access point, wherein the first distance value is calculated using the preprocessed RSSI information, and the second distance value is calculated based on a particle filter distributed in the indoor space;
      estimate an approximated location of the tag from a location of each of the resampled particles by calculating a weight of each of the particles distributed in the indoor space based on a difference value between the first distance value and the second distance value; and
   track the estimated approximated location of the tag.

* * * * *